United States Patent [19]
Hitomi et al.

[11] Patent Number: 6,054,692
[45] Date of Patent: Apr. 25, 2000

[54] HEATING DEVICE, HEAT STORING TYPE HEAT GENERATING BODY AND PROTECTIVE SHEET FOR THE HEATING DEVICE

[75] Inventors: Takehiko Hitomi, 20-104, Tamagawa 2-chome, Takatsuki, Osaka 569; Mitsukazu Ogawa, 4-31-308, Midorigaoka 2-chome, Ikeda, Osaka 563; Toshio Saburi, Tokyo, all of Japan

[73] Assignees: Takehiko Hitomi; Mitsukazu Ogawa, both of Osaka, Japan

[21] Appl. No.: 09/202,675

[22] PCT Filed: Jun. 25, 1997

[86] PCT No.: PCT/JP97/02205

§ 371 Date: Jan. 22, 1999

§ 102(e) Date: Jan. 22, 1999

[87] PCT Pub. No.: WO97/50279

PCT Pub. Date: Dec. 31, 1997

[51] Int. Cl.[7] .................................................. H05B 3/06
[52] U.S. Cl. .................. 219/540; 219/541; 219/544; 219/553; 219/549; 219/469; 219/517; 392/501; 392/453; 392/488; 392/456; 392/375; 392/502
[58] Field of Search ................................. 219/540, 541, 219/544, 553, 549, 469, 517, 245, 464; 392/501, 453, 456, 488, 375, 502

[56] References Cited

U.S. PATENT DOCUMENTS

| | | | |
|---|---|---|---|
| 3,646,321 | 2/1972 | Siegla | 219/464 |
| 4,147,927 | 4/1979 | Pirotte | 219/541 |
| 4,197,449 | 4/1980 | Fessenden | 219/549 |
| 4,210,800 | 7/1980 | Van Bokestal et al. | 219/544 |
| 4,320,284 | 3/1982 | Dannatt | 219/469 |
| 4,341,949 | 7/1982 | Steiner et al. | 219/553 |
| 4,352,008 | 9/1982 | Hofer et al. | 219/540 |
| 4,673,801 | 6/1987 | Leary et al. | 219/544 |
| 4,713,524 | 12/1987 | Leo et al. | 392/488 |
| 4,728,779 | 3/1988 | Kotani et al. | 219/517 |

(List continued on next page.)

FOREIGN PATENT DOCUMENTS

| | | |
|---|---|---|
| 2-82483 | 3/1909 | Japan . |
| 59-94214 | 6/1984 | Japan . |
| 59-198685 | 11/1984 | Japan . |
| 62-89795 | 6/1987 | Japan . |
| 63-109479 | 7/1988 | Japan . |
| 3-160272 | 7/1991 | Japan . |
| 4-83750 | 3/1992 | Japan . |
| 4-82654 | 7/1992 | Japan . |
| 5-217662 | 8/1993 | Japan . |
| 5-266965 | 10/1993 | Japan . |
| 6-82051 | 3/1994 | Japan . |
| 3004753 | 9/1994 | Japan . |

*Primary Examiner*—Teresa Walberg
*Assistant Examiner*—L Fastovsky
*Attorney, Agent, or Firm*—Jordan and Hamburg LLP

[57] ABSTRACT

In a heating device used for melting snow on a road, a roof or the like, or for room heating of in-door facilities, in order to heat a to-be-heated or heated object uniformly over its entire area and enable to utilize effectively a PTC heater, a heat diffusing plate 14 for diffusing heat generated from a heat generating body 16 is arranged on an upper face of the heat insulating member 12 and the heating body 16 is arranged in a recess portion 13 installed on its upper face. The heating body 16 is constituted by inserting a heat generating element 4 mounted with heat radiating plates 5 into a vessel 2 enclosed with a heat storing agent 3 of a latent heat absorbing type in a state in which the heat generating element is brought into contact with the heat storing agent 3. Further, in order to protect the heating device 10, a protective sheet 18 formed by impregnating a base stuff with petroleum asphalt admixed by a far infrared emissive material is laid to cover a heat source portion, and between a surface layer 20 and a base layer 22, the heat source portion is integrally fixed to these layers.

18 Claims, 16 Drawing Sheets

U.S. PATENT DOCUMENTS

| | | | |
|---|---|---|---|
| 4,797,534 | 1/1989 | Prager et al. | 392/456 |
| 4,822,980 | 4/1989 | Carbone et al. | 392/453 |
| 4,931,626 | 6/1990 | Shikama et al. | 219/540 |
| 4,987,290 | 1/1991 | Okuno | 392/375 |
| 5,192,853 | 3/1993 | Yeh | 219/540 |
| 5,633,978 | 5/1997 | Hofsass | 392/501 |
| 5,804,791 | 9/1998 | Gelus | 219/245 |
| 5,828,810 | 10/1998 | Frank et al. | 392/502 |
| 5,854,471 | 12/1998 | Tadokoro et al. | 219/540 |

Fig. 15
(a)
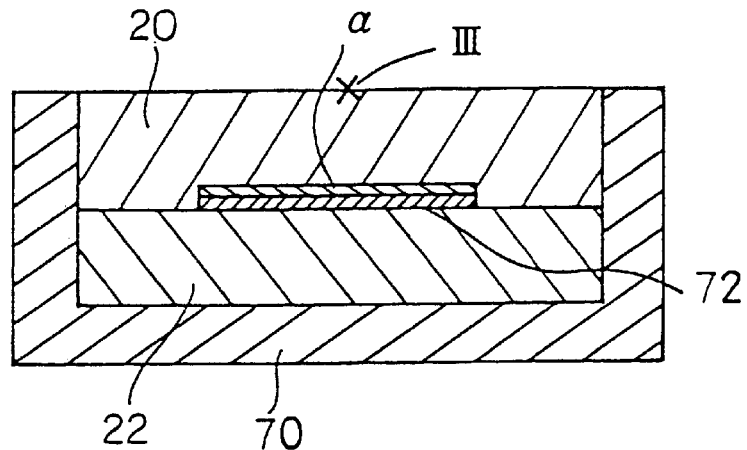
(b)
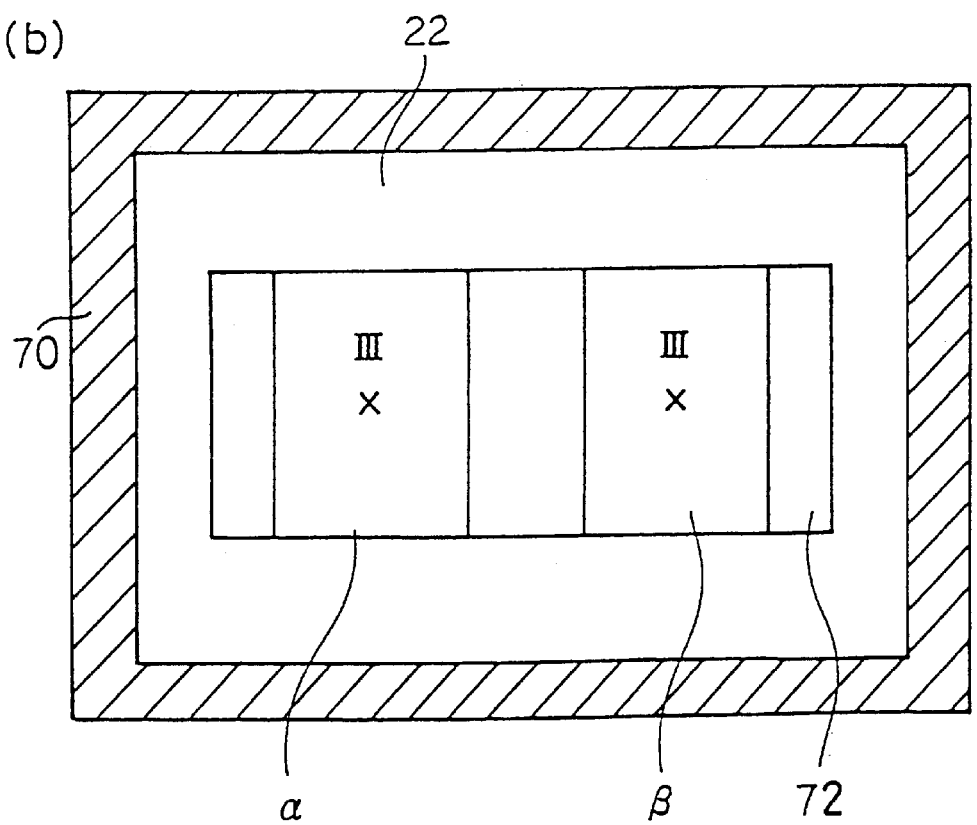

HEATING DEVICE, HEAT STORING TYPE HEAT GENERATING BODY AND PROTECTIVE SHEET FOR THE HEATING DEVICE

TECHNICAL FIELD

The present invention relates to a heating device used for melting snow or preventing freeze of a road, a parking lot, a roof or the like, for room-heating at in-door facilities, heating at a green house in agricultural use, heating at fishfarm in fishery use, or the like. The present invention also relates to a heat storing type heat generating body and a protective sheet, which are preferably used in the heating device.

BACKGROUND ART

Conventionally, a heating device for melting snow on a road, heating a floor surface or the like is constituted by embedding a heat generating body below the road surface or the floor surface. According to such a heating device, heat generated from the heat generating body reaches the surface via the nearest path, and accordingly, only right above the heat generating body is heated. As a result, effect of uniform heating of to-be heated object is difficult to achieve over an entire region thereof.

Further, in such a heating device, an electric heater having a PTC characteristic, that is, a self temperature and the latent heat accompanied by the phase transition is absorbed to thereby store heat, may be used. In such a latent heat absorbing type heat storing agent, it is particularly important to absorb the latent heat in a short period of time in achieving effective use thereof.

However, according to a conventional heating device, a vessel (for example, pipe) enclosed with a heat storing agent is placed on an electric heater in a planar shape, or in otherwise, a recess portion is installed on the surface of a vessel in a shape of a planar plate enclosed with a heat storing agent, while a heat generating body of an electric heat line or the like is arranged in the recess portion, so that heat is absorbed by the heat storing agent by conducting electricity to the heat generating body.

Therefore, Joule's heat generated from the heat generating body is absorbed by the heat generating agent after radiating heat to the surrounding (lowering of temperature and energy amount) and via heat resistance of the vessel per se and accordingly, an energy absorbing rate of the heat storing agent is significantly low and effective absorption of latent heat is difficult. Further, an energy absorbing efficiency of the heat storing agent is low and therefore, only a heat storing agent having a low melting temperature can be used and an amount of the heat storing agent (heat storing capacity) cannot be increased.

Hence, it is a second object of the present invention control function may be used as a heat generating body. The heat generating body having the PTC characteristic is featured in that the current resistance value is increased in response to rise of self temperature by electricity conduction and the current value is lowered and accordingly, the heat generating body is excellent in controllability, safety and economic performance since constant temperature can be maintained without being controlled from outside.

However, according to the above-described conventional structure, it has been difficult to effectively utilize the PTC characteristic. That is, temperature of a vicinity of the heat generating body is locally elevated by electricity conduction, the current value of the heat generating body is lowered and it is difficult to heat the surrounding swiftly and uniformly.

Hence, it is a first object of the present invention to provide a heating device which is easy to achieve effect of uniform heating of the to-be heated object over an entire region thereof and which can effectively utilize a heat generating body having the PTC characteristic.

Meanwhile, conventionally, according to such a heating device, a heat storing agent storing heat of a heat generating body may be used. In such a case, as a heat storing agent, a heat storing agent of a latent heat absorbing type in which the phase is changed between a solid phase and a liquid phase by a change in temperature to provide a heat storing type heat generating body capable of swiftly absorbing latent heat, using a heat storing agent having a high melting temperature, and providing high heat storing capacity by effectively utilizing energy generated from a heat generating element, so as to achieve high efficiency formation of energy absorption of the heat storing agent.

Further, until now, various snow melting and heating methods utilizing far infrared ray radiation energy have been proposed in the market and applied in an experimental scale. For example, in asphalt paving, following methods and others are proposed. In one method, heat generating lines are laid on a base layer of a pavement, and subsequently, an asphalt-road-paving material admixed by the far infrared emissive material are laid as a surface layer. In another method, a far infrared emissive layer is formed on the surface of an asphalt surface layer, while heat conducted from et heat source of heat generating lines, hot water pipes or the like under the ground is converted into far infrared ray radiation energy, so as to melt snow on a road surface.

However, it is the current state that in any of these methods, significant merit is not achieved in comparison with a conventional snow melting or heating method in accordance with a heat conduction system. Further, the current state is brought into a situation in which there frequently causes an accident of disconnecting or destruction of the embedded heat source portion by impact load, vibration or the like from the surface of the surface layer. Further, in the case of embedding the heat source portion under the surface layer in such a way, there causes a problem in which interface cleavage is caused between the surface layer and the heat source portion by repeated elongation and contraction caused by impact, load and vibration from the surface of the surface layer or a variation in temperature in the road, which amounts to destruction of the surface layer such as crack or the like.

Hence, it is a third object of the present invention to provide a protective sheet for a heating device by which in a heating device, protection and strengthening of a total of device is achieved by achieving protection of a heat source portion and promotion of strength and durability of a surface layer of a road, a floor or the like and effective use of far infrared radiation energy can be achieved.

DISCLOSURE OF THE INVENTION

According to an aspect of the present invention, there is provided a heating device comprising a heat insulating member having a recess portion on an upper face thereof, a heat generating body arranged in the recess portion and a heat diffusing plate installed on the upper face of the heat insulating member and interposed between the heat insulating member and the heat generating body for diffusing heat generated from the heat generating body.

According to the heating device, energy generated from the heat generating body is not conducted to escape downwardly owing to the heat insulating member and is swiftly spread in the lateral direction by the heat diffusing plate. Therefore, local temperature rise at a vicinity of the heat generating body can be prevented and energy can swiftly be diffused not only in the upward direction but in the lateral direction. Therefore, uniform heating effect is easy to obtain for to-be heated object over its entire region. Further, as mentioned above, local temperature rise at a vicinity of the heat generating body can be prevented and therefore, particularly when the heat generating body having the PTC characteristic is used, lowering a current value caused by elevation of self temperature of the heat generating body can be prevented and surrounding can be heated swiftly and uniformly. Further, the heat insulating member can effectively be utilized.

It is preferable in the heating device that a far infrared emissive layer is formed on the upper face of the heat diffusing plate. The far infrared emissive layer on the upper face of the heat diffusing plate is heated by energy supplied from the heat generating body and radiates far infrared ray upwardly over a wide area.

It is preferable in the heating device to arrange a far infrared emissive layer to cover the heat insulating member from above the heat generating body. The far infrared emissive layer arranged to cover the heat insulating member receives energy supplied from the heat diffusing plate on the upper face of the heat insulating member and the heat generating body, and reradiates far infrared ray upwardly over a wide area.

In this case, it is preferable that the heat insulating member is arranged on a base layer, while the far infrared emissive layer arranged to cover the heat insulating member is provided with thermal fusion performance, so that the heat insulating member and heat generating body are integrated and fixed onto the base layer by the thermal fusion performance. Further, it is preferable that a surface layer is formed on the far infrared emissive layer and the base layer, the surface layer, the heat insulating member and the heat generating body are melted to integrate by the thermal fusion performance of the far infrared emissive layer. Thereby, particularly when the heating device is used by being embedded under the surface layer, lowering of the strength can be prevented.

Further, by forming the surface layer on the far infrared emissive layer arranged to cover the heat insulating member and admixing a far infrared emissive material with far infrared ray radiated from the far infrared emissive layer as an absorption band to the surface, attenuation of the far infrared ray is confined to the minimum and the far infrared ray can be reradiated to and absorbed by a to-be-heated or heated object on the surface of the surface layer efficiently.

According to another aspect of the present invention, there is provided a heat storing type heat generating body, wherein in a vessel enclosed with a heat storing agent for absorbing latent heat by being subjected to a phase transition between a solid phase and a liquid phase, a heat generating element is inserted in a state in which the heat generating element is brought into contact with the heat storing agent, and wherein the heat generating element is mounted with heat radiating plates for diffusing heat into the vessel.

In the case of the heat storing type heat generating body, the heat generating element mounted with the radiating plates is inserted into the vessel enclosed with the heat storing agent of a latent heat absorbing type to be brought into contact with the heat storing agent and accordingly, the heat storing agent can absorb heat conducted directly from the heat generating element and indirectly via the heat radiating plates from the heat generating element. Therefore, effective use of energy generated from the heat generating element and high efficiency formation of absorbing energy of the heat storing agent can be achieved and accordingly, swift and more uniform latent heat absorption can be conducted, so that use of the heat storing agent having high melting temperature and increase in the heat storing capacity can be achieved.

Further, by such a constitution, lowering of current by local overheating phenomenon caused at a contact face between the heat storing agent and the heat storing element and effective utilization of the PTC characteristic can be achieved when an electric heater having the self temperature control function is used as the heat generating element.

It is preferable in the above-described heat storing type heat generating body that the heat storing agent is a heat storing agent having a molecular structure of an electric dipole absorbing far infrared ray and a far infrared emissive layer is formed on the surfaces of the heat radiating plates. By such a particular combination of the heat storing agent and the far infrared emissive layer, energy generated from the heat generating element is radiated as far infrared ray (electromagnetic wave) from the far infrared emissive layer on the surfaces of the heat radiating plates and molecules of the heat storing agent are vibrated and excited by directly absorbing the far infrared ray. As a result, the heat storing agent in the vessel receives two kinds of energy supply of direct or indirect thermal conduction from the heat generating element and the heat radiating plate and far infrared ray radiation from the far infrared emissive layer and temperature thereof is elevated uniformly and swiftly to melting temperature over whole of the vessel and the latent heat is absorbed.

It is preferable in the above-described heat storing type heat generating body that the heat storing agent is admixed by a far infrared emissive material having an absorption at wavelength region of a far infrared ray radiated from the far infrared emissive layer formed on the surfaces of the heat radiating plates. The far infrared emissive material admixed to the heat storing agent is excited by receiving two kinds of energy of the far infrared ray radiation from the surface of the radiating plates and heat conduction, expedites molecular vibration of the heat storing agent and expedites elevation of the temperature.

It is preferable in the above-described heat storing type heat generating body that two kinds or more of the heat storing agents having different melting temperatures are enclosed in the vessel. The heat storing agent enclosed in the vessel receives energy supply from the heat generating element and the heat radiating plates and firstly, a heat storing agent having a low melting temperature is liquefied. As the result, fluidizing phenomenon is caused over the entire heat storing agent in the vessel and the heat storing agent is stirred by which a heat storing agent having a high melting temperature absorbs energy from the overheated heat storing agent having low melting temperature and the heat radiating plates and so on and reaches melting temperature in a short period of time.

It is preferable in the above-described heat storing type heat generating body that a metallic heat radiating line coated by a far infrared emissive layer is wound around the outer peripheries of the heat radiating plates mounted to the heat generating element. Thereby, temperature elevation and latent heat absorption of the heat storing agent in the vessel is further expedited and temperature elevation on the surface of the vessel is significantly accelerated.

It is preferable in the above-described heat storing type heat generating body that a ceramic coating layer including far infrared emissive material is formed on the surface of the vessel. Such a constitution is particularly effective when the vessel is made of resin and the heat generating body is used for melting snow on a road.

It is preferable that the heat storing type heat generating body is used as the heat generating body of the heating device of the present invention mentioned above. Thereby, the far infrared emissive layer on the heat radiating plate maintains stable temperature by energy supplied from the heat storing agent and can stably radiate far infrared ray.

The protective sheet according to the present invention is constituted by impregnating a mixture liquid constituted by adding a far infrared emissive material to petroleum asphalt and melting and mixing them and is provided with both of the far infrared ray radiation function and the thermal fusion performance.

The protective sheet according to the present invention can be used by being laid on a heat source portion to protect the heat source portion in the heating device constituted by embedding the heat source portion between the base layer and the surface layer. In such a use, the protective sheet is melted to integrate the heat source portion between the base layer and the surface layer by the thermal fusion performance by petroleum asphalt, achieves protection of the heat source portion and can promote strength and durability of the surface layer by which protection and strengthening of a total of the device can be achieved. Further, by adding the far infrared emissive material, energy from the heat source portion can be radiated as far infrared ray in wide radiation area and effective use of the far infrared ray radiation energy can be achieved. Particularly, when the heat source portion per se radiates the far infrared ray, the far infrared ray is not attenuated and absorbed over a large area and can be reradiated. Further, the tensile strength of the protective sheet is increased by the base stuff and accordingly, the heat source portion and the surface layer can be protected from force operating in the shear direction.

It is preferable in the protective sheet of the present invention that graphite is admixed to the mixture liquid. Thereby, not only the thermal conduction performance is improved but also the radiant exitance of the far infrared ray is promoted.

According to the protective sheet of the present invention, a double layer structure may be constituted by coating a mixture of petroleum asphalt and the far infrared emissive material on one face or both faces thereof. Such a double layer structure is advantageous in view of the fact that propagation of the far infrared ray radiation is not lowered, the fusion strength is promoted and at the same time, thermal conduction and radiation effect can be promoted.

The protective sheet is preferably used as the far infrared emissive layer arranged to cover the upper face of the heat insulating member in the above-described heating device according to the present invention.

BRIEF DESCRIPTION OF DRAWINGS

FIG. 15(a) is a longitudinal sectional view of a test body according to Text Example 5 and FIG. 15(b) is a horizontal sectional view thereof.

BEST MODE FOR CARRYING OUT THE INVENTION

An explanation will be given of embodiments of the present invention in reference to the drawings as follows.

Figure 1:
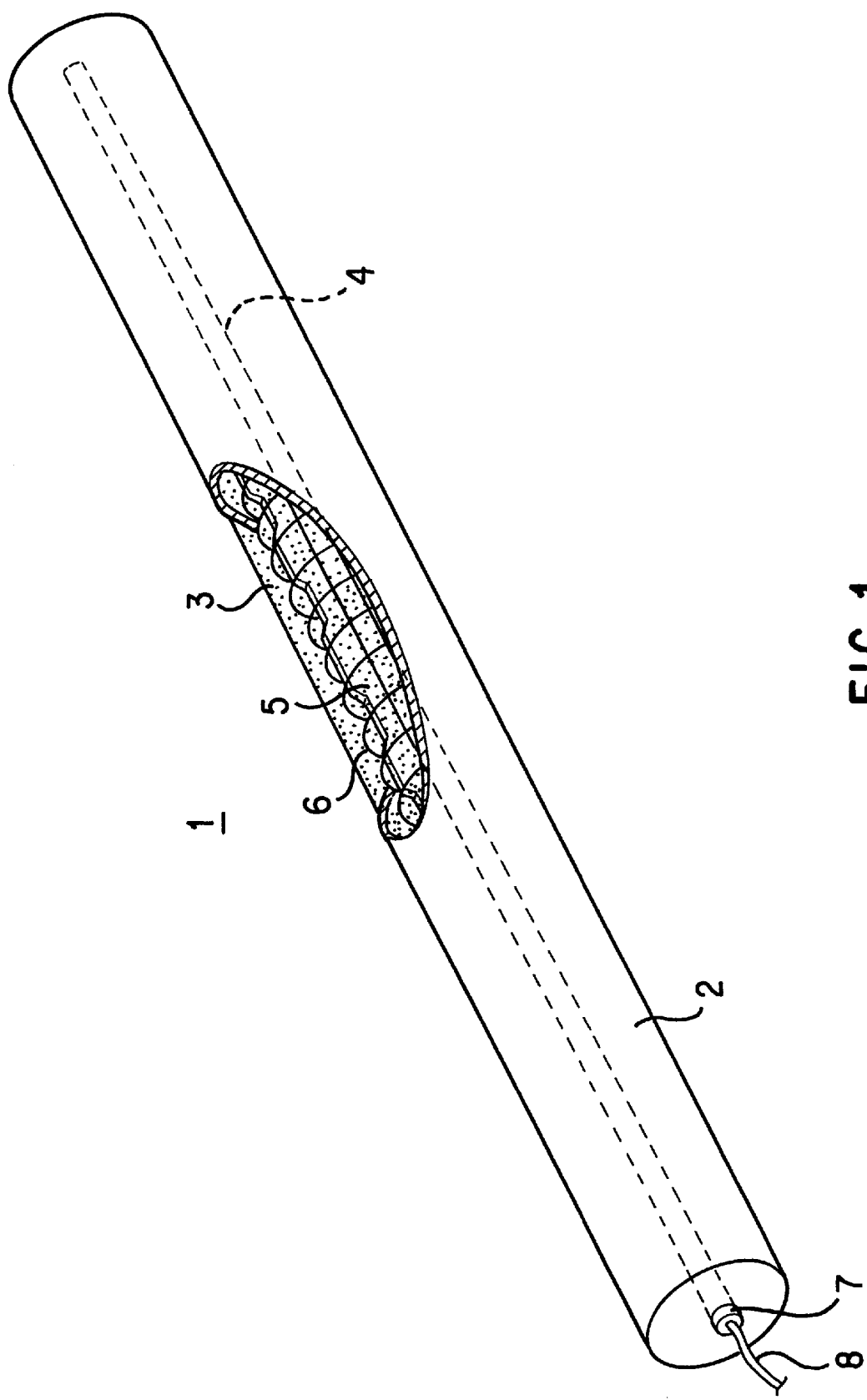
FIG. 1 is a partially cut perspective view showing a heat storing type heat generating body (1) according to an embodiment of the present invention.
Figure 2:
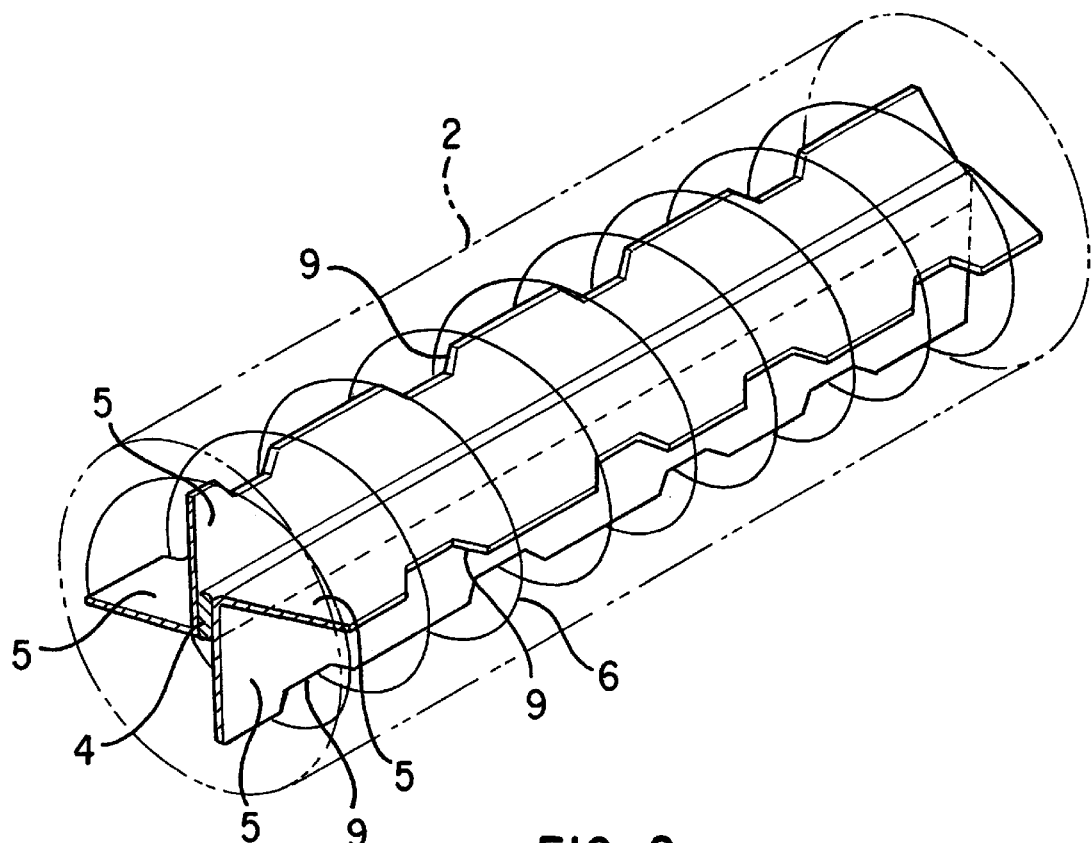
FIG. 2 is a perspective view showing structure of a heat generating element (4), a heat radiating plate (5) and a metal line (6) of the heat storing type heat generating body (1).
Figure 3:
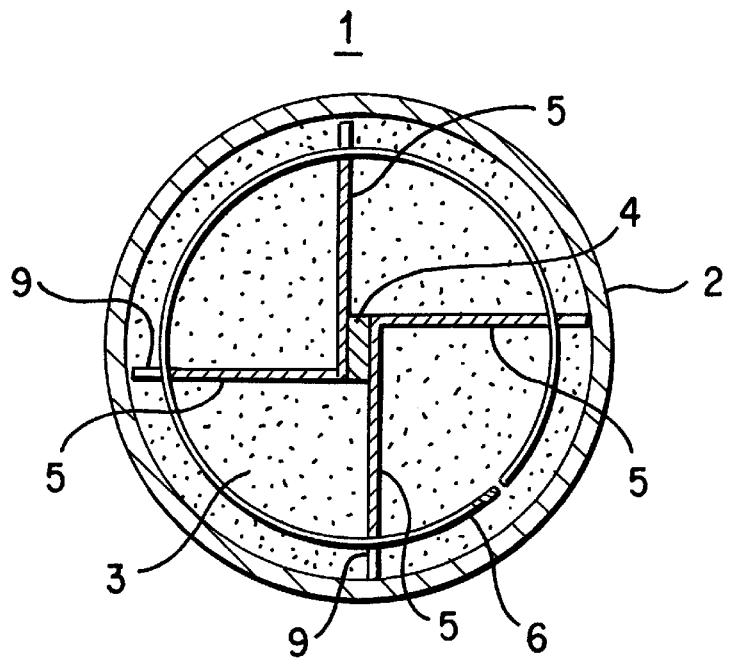
FIG. 3 is a sectional view of the heat storing type heat generating body (1).

FIGS. 1 through 3 shows a heat storing type heat generating body (1) according to an embodiment of the present invention and in the drawings, numeral (2) designates a heat storing vessel, numeral (3) designates a heat storing agent, numeral (4) designates a heat generating element, numeral (5) designates a heat radiating plate and numeral (6) designates a heat radiating metal line, respectively.

The heat storing vessel (2) is a pipe made of a metal or synthetic resin constituting a cylindrical shape and the heat storing agent (3) is enclosed at inside thereof.

The heat storing agent (3) is subjected to solid-liquid phase transition by its temperature change, so as to absorb or emit latent heat accompanied by the phase transition. As the heat storing agent (3), different from general heat storing agent, a heat storing agent having the molecular structure of electric dipole capable of absorbing far infrared ray is used. As a heat storing agent having the molecular structure of electric dipole absorbing far infrared ray, polyoxyalkylene such as polyethylene glycol or the like is preferable.

The heat storing agent (3) contain a far infrared emissive material. As a far infrared emissive material, one having a high emissivity at around 10 micrometers is preferably selected. As a preferable example thereof, fine powder of granite or rhyolite whose major components are silica oxide, alumina oxide and so on or fly ash (coal ash) or the like can be pointed out. Further, it is preferable to admix a metal oxide such as iron oxide, manganese dioxide, nickel oxide or the like by a pertinent amount.

The heat generating element (4) mounted with the radiating plates (5) is inserted into the heat storing vessel (2) enclosed with the heat storing agent (3) in a state of being brought into contact with the heat storing agent (3). The heat generating element (4) is arranged over an entire length of the heat storing vessel (2) substantially on a center line thereof. A wiring (8) for supplying power source is drawn out from the heat storing vessel (2) through a seal member (7) attached to a side face of the heat storing vessel (2).

The heat generating element (4) is an electric heater in a tape-like shape (width of about 10 through 20 mm) provided with a self temperature control function having the PTC characteristic. According to the heat generating element (4), an electric resistance value is increased in response to temperature rise of itself caused by conducting of electricity, so that a current value thereof is lowered. When temperature is further elevated to reach predetermined temperature (for example 80° C.), the current value is further reduced so as to hold constant temperature while being balanced with heat emittance, showing excellent feature in controllability, safety, economic performance capable of holding constant temperature without being controlled from outside. The heat generating element (4) is formed as follows: Carbon and organic polymer resin are admixed by roll-milling. To this organic thermal semiconductor, electrodes of a parallel circuit is installed. The circuit is covered and insulated and so on by synthetic resin. A resistance value between the electrodes remains unchanged even when the tape-like shape electric heater is cut by any length.

The radiating plates (5) mounted to the heat generating element (4) are for diffusing heat generated from the heat generating element (4) to inside of the heat storing vessel (2). The heat generating plate (5) comprises a metal plate having excellent thermal conduction performance and is extended radially from the heat generating element (4) arranged at the center of the heat storing vessel (2) as shown by FIGS. 2 and 3. Further, a plurality of recess portions (9, 9 . . . ) are formed at the outer edge portions of the heat radiating plates (5) at predetermined intervals to promote flow effect of the heat storing agent (3). Far infrared emissive layers are formed on the both surfaces of the heat radiating plate (5). The far infrared emissive layer can be formed by coating a paint or varnish containing the far infrared emissive material mentioned above. Or, the far infrared emissive layer can also be formed by subjecting the surface of the heat radiating plate (metal plate) to oxidation processing. Further, it is preferable that the heat radiating plate (5) is not as thin as a metal foil and is provided with a sectional area, thermal conductivity and heat dissipating (radiating) area to make heat conduction sufficiently effective and stably provide far infrared ray of required wavelength.

The outer periphery of the heat radiating plate (5) is wound with the heat radiating metal line (6) such as a copper line, an aluminum line or the like, on which the far infrared emissive layer is formed. That is, the heat radiating metal line (6) is brought into contact with the heat radiating plates (5) extended in a radial shape and wound around outer peripheries thereof in a spiral shape. A far infrared emissive layer covering the heat radiating metal line (6) can be formed by a coating material including a far infrared emissive material mentioned above. Or, a far infrared emissive layer can be formed by subjecting the surface of the metal line to oxidation processing. It is preferable to wind the heat radiating metal line (6) to engage with the recess portions (9, 9 . . . ) of the outer edge portions of heat radiating plates (5).

A ceramic coating layer of about 10 μm con a far infrared radiation material is formed on the surface of the heat storing vessel (2). When the heat storing type heat generating body (1) is used in a device of melting snow on an asphalt road or the like, the ceramic coating layer operates as a thermal buffer layer for alleviating thermal shock from outside at asphalt-paving work. Further, the ceramic coating layer works for converting stored heat energy at inside of the heat storing vessel (2) into far infrared ray to thereby radiate the energy to outside. Thermal buffering mentioned here is not the concept of normal heat insulation (air) but is intended to provide thermal buffer effect from a new view point—absorbing energy entered from outside temporarily and reradiating to outside to thereby prevent invasion of heat.

Therefore, the ceramic coating agent must be blended with a far infrared emissive material having a reradiation rate in conformity with the object, while the ceramic coating agent per se must be blended with components capable of withstanding temperature at asphalt-paving work. Hence, as such a ceramic coating agent, aqueous latex resin-based coating agent containing the above-described far infrared emissive material is preferably used.

According to the heat storing type heat generating body (1) constituted as described above, electricity is supplied to the heat generating element (4) on accepting of an operation signal, and thus, heat generation is started. Joule's heat generated by the heat generating element (4) is supplied directly or indirectly to the heat storing agent (3). That is, the heat storing agent (3) at a vicinity of the heat generating element (4) absorbs heat generated from the heat generating element (4) and in the meantime, the heat storing agent (3) at a vicinity of an inner wall of the heat storing vessel (2) remote from the heat generating element (4) absorbs heat from the heat radiating plate (5) or the heat radiating metal line (6). Further, the heat storing agent (3) directly absorbs far infrared ray, having a maximum region at 10 μm wavelength, that is radiated from the far infrared emissive layers formed on the both faces of the radiating plate (5), the far infrared emissive layer on the surface of the heat radiating metal line (6), the far infrared emissive material admixed to the heat storing agent (3) and so on. Thereby, molecules of the heat storing agent are brought into an excited state.

By providing two different energy transfer—far infrared ray radiation and heat conduction—to the heat storing agent (3), the heat storing agent (3) reaches rapidly to a melting temperature and is liquefied by completing absorption of latent heat in a short period of time. When a sensor detects the liquefaction, the operation signal is made OFF and the liquefied heat storing agent (3) returns to a solid phase by emitting absorbed latent heat.

In this way, in the case of the heat storing type heat generating body (1), two energy transfer of far infrared ray radiation and heat conduction can be applied to the heat storing agent (3) over an entire region of the heat storing vessel (2) and accordingly, absorption of latent heat of the heat storing agent (3) can be completed rapidly and uniformly. Therefore, a time period until starting to heat or melt snow can be shortened. Further, the heat storing agent (3) having a high melting temperature can be used by which effect of heating room and melting snow can be promoted. Further, by increasing an amount of the heat storing agent (3), the effect of heating room and melting snow may be sustained for a long period of time.

In the above-described heat storing type heat generating body (1), in respect of the heat storing agent (3), it is preferable that the melting temperature is 18 through 55° C. when it is used for melting snow. In the meantime, when it is used for heating in floor heating or the like, it is preferable that the melting point is 35 through 61° C.

It is preferable to use the heat storing agent (3) in which two kinds or more of the heat storing agents having different melting temperatures is blended. In this case, in respect of the heat storing agent (3) enclosed in the heat storing vessel (2), by receiving two-way energy supply of far infrared ray radiation and heat conduction, firstly, the heat storing agent having a low melting temperature absorbs energy and is liquefied. At the same time, an admixed far infrared emissive material is also excited. As a result, a fluidization is occurred to the heat storing agent (3) at inside of the heat storing vessel (2) as a whole. Thus, the heat storing agent (3) is stirred. As a result, by receiving radiation and heat conduction uniformly from the overheated heat storing agent having a low melting temperature, the far infrared emissive material, the radiation plates (5) and so on, molecular oscillation is caused in the heat storing agent having a high melting temperature. In this way, the heat storing agent absorbs latent heat and reaches the melting temperature in a short period of time.

Further, in the case in which much time may be required for the heat storing agent (3) to reach the melting point as in a severely cold district or a mountainous district, it is preferable to increase blending ratio of the heat storing agent having the low melting temperature to swiftly reach the melting temperature. Further, it is preferable to lower the melting point of the heat storing agent having the high melting temperature by one rank.

Although in the above-described constitution, as the heat storing vessel (2), a pipe made of resin or made of metal constituting a cylindrical shape has been used, the heat storing vessel (2) is not limited to a pipe but a planar plate-shaped vessel may be used in accordance with necessary object.

Further, generally, as a pipe made of resin embedded in asphalt for melting snow, in order to withstand temperature of asphalt-road-paving material (about 150° C. or higher) at paving work, a high-density cross-linked polyethylene pipe having excellent heat resistance is used with a metal foil (such as an aluminum foil or the like) of about 15 μm wound around on its surface. Because it is difficult to adhere the metal foil onto the pipe, a structure is adopted in which the metal foil is simply wound around the pipe and is fixed by a heat resistant tape.

However, according to the structure, there poses a problem in which the metal foil is easily delaminated from the pipe during working at a construction site. In work of bending the pipe, the metal foil at a bent portion is delaminated to make a gap from paipe's surface, and accordingly, operation as the thermal buffer layer for protecting the pipe is not sufficiently be achieved. Hence, according to the embodiment, the ceramic coating layer is formed on the surface of the heat storing vessel (2). The structure is particularly advantageous in the case in which a vessel made of resin such as a cross-linked polyethylene pipe or the like is used as the heat storing vessel (2) and is applied in melting snow on an asphalt road.

According to the embodiment, by a synergic effect in which the ceramic coating layer operates as the thermal buffer layer against heat from outside and the heat storing agent (3) absorbs heat passing through the pipe wall of the heat storing vessel (2), the thermal shock on the heat storing vessel (2) at asphalt-paving work is alleviated and the structure permits use in a high temperature atmosphere at an allowable heat resistant temperature of the resin or higher.

In the above-described constitution, the heat generating element (4) is not limited to the tape-like heater having the PTC characteristic but a planar heater having the PTC characteristic, a planar heater or a heat generating line having no PTC characteristic may be used. Further, heat source of hot water, a heat pipe or the like can also be utilized.

The heat storing type heat generating body (1) is not limited to melting snow or indoor floor heating. For example, heat can be used effectively as a heat storing type heat generating body for air conditioning. Originally, a heat storing agent which is subjected to phase transition between a solid phase and a liquid phase by absorbing latent heat is significantly more advantageous than a heat storing agent for storing sensible heat in a form of water or an antifreeze liquid in view of an energy storing amount per unit volume, stability in a range of temperature of use and so on. However, different from storing heat by using ice, at an initial stage of absorbing latent heat, the heating body is in a solid phase and is devoid of fluidity. Therefore, pertinent technical development for absorbing latent heat by providing energy conveniently and efficiently has been requested.

According to the above-described heat storing type heat generating body (1), even with a very simple and convenient structure in which the heat storing agent (3) constituted by admixing two kinds or more of heat storing agents and a far infrared emissive material, is enclosed in the heat storing vessel (2) and the heat generating element (4) mounted with the heat radiating plates (5) each having the far infrared emissive layer is inserted into the heat storing vessel (2) to be brought in direct contact with the heat storing agent (3), by the synergic effect of far infrared ray radiation and heat conduction, rapid liquefaction (latent heat absorption) of the heat storing agent (3) is achieved. The heat storing type heat generating body (1) can be used as an indoor installing type heat generating device (small-capacity heat storing type heat generating device) installed at the vicinity of a window or on the side of a wall, or can be used as a large capacity heat storing type heat generating device installed at an underground room, on a roof or the like of a building or a factory. In any cases, by utilizing the heat storing type heat generating body (1), there can be achieved significant merit of wasteless heating operation, swiftly absorbing energy, ON-OFF operation for reducing a power reception capacity by 50%, use of significantly discounted power at night time, or the like.

Figure 4:
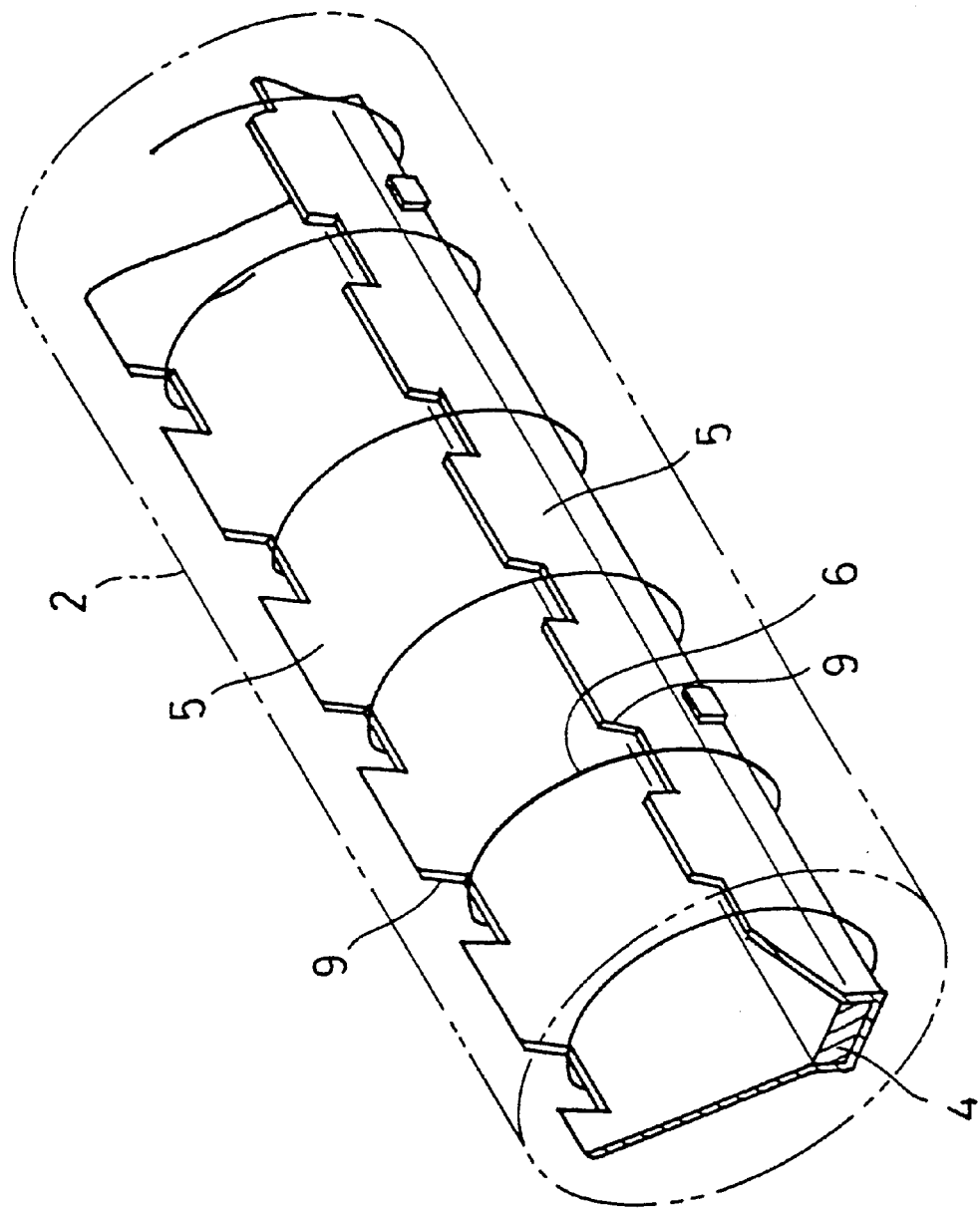
FIG. 4 is a perspective view showing a modified example of the heat radiating plate (5) in the heat storing type heat generating body (1).
Figure 5:
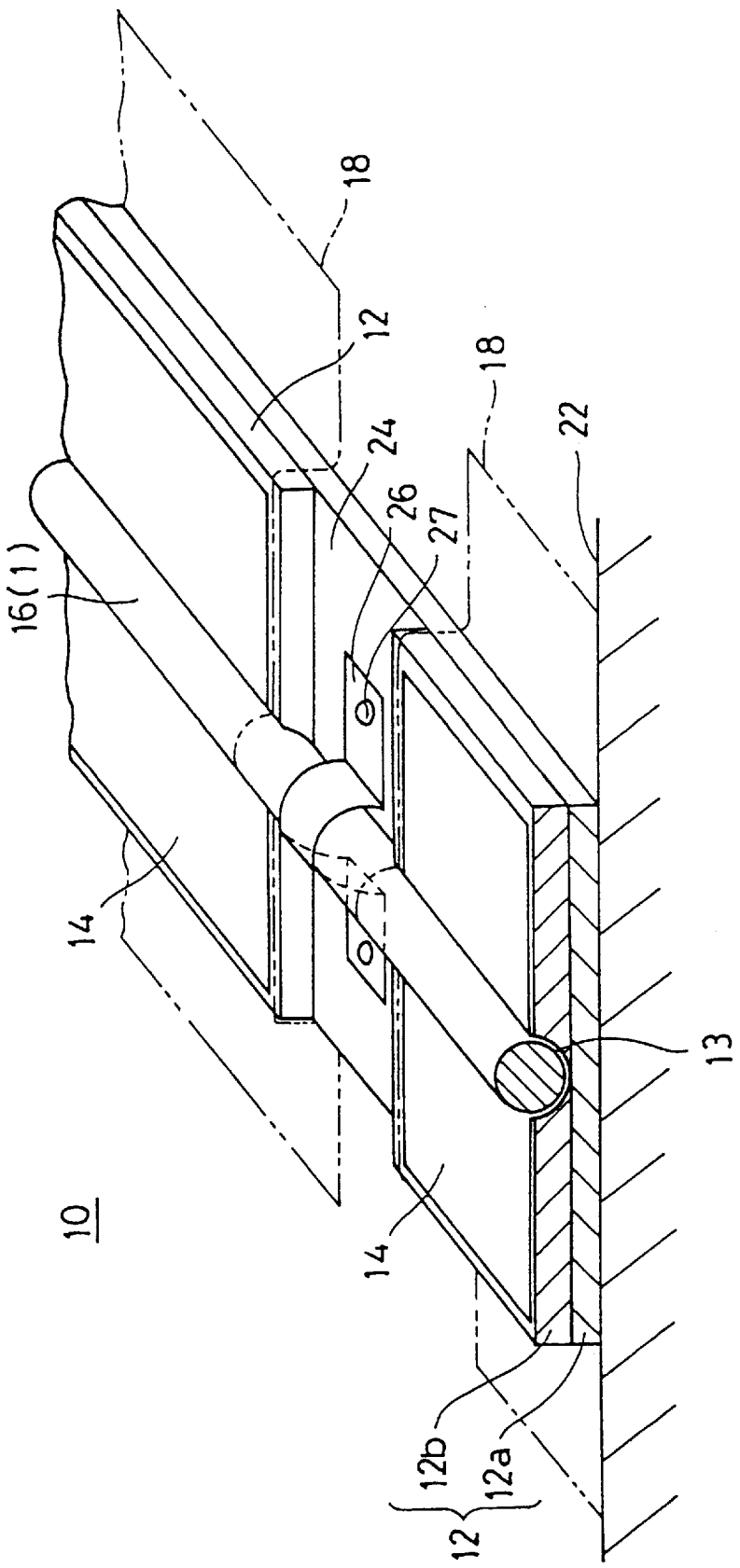
FIG. 5 is a perspective view of a section showing a heating device (10) according to an embodiment of the present invention.

FIG. 4 shows an example, in which the constitution of arranging the heat radiating plates (5) in the above-described heat storing type heat generating body (1) is changed.

According to the example, the heat generating element (4) is inserted on a side of a bottom portion of the heat storing vessel (2) in a state in which the heat generating element (4) is pinched at a bottom portion of the radiating plate (5) the section of which is formed substantially in a V-like shape. Also in this case, the far infrared emissive layer is formed on the surface of the heat radiating plate (5) and the plurality of recess portion (9, 9 . . . ) are formed at the outer edge portions of the heat generating plate (5) at predetermined intervals. Further, the heat radiating metal line (6) coated with a thin film of the far infrared emissive layer is wound around the outer periphery of the heat radiating plate (5) to be engaged with the plurality of recess portions (9, 9 . . . ).

FIGS. 5 through 9 show a heating device (10) according to an embodiment of the present invention and in the drawings, numeral (12) designates a heat insulating member, numeral (14) designates a heat diffusing plate, numeral (16) designates a heat generating body, numeral (18) designates a protective sheet, numeral (20) designates a surface layer, and numeral (22) designates a base layer, respectively. The heating device (10) of the embodiment is used as a device of melting snow on a road.

Figure 8:
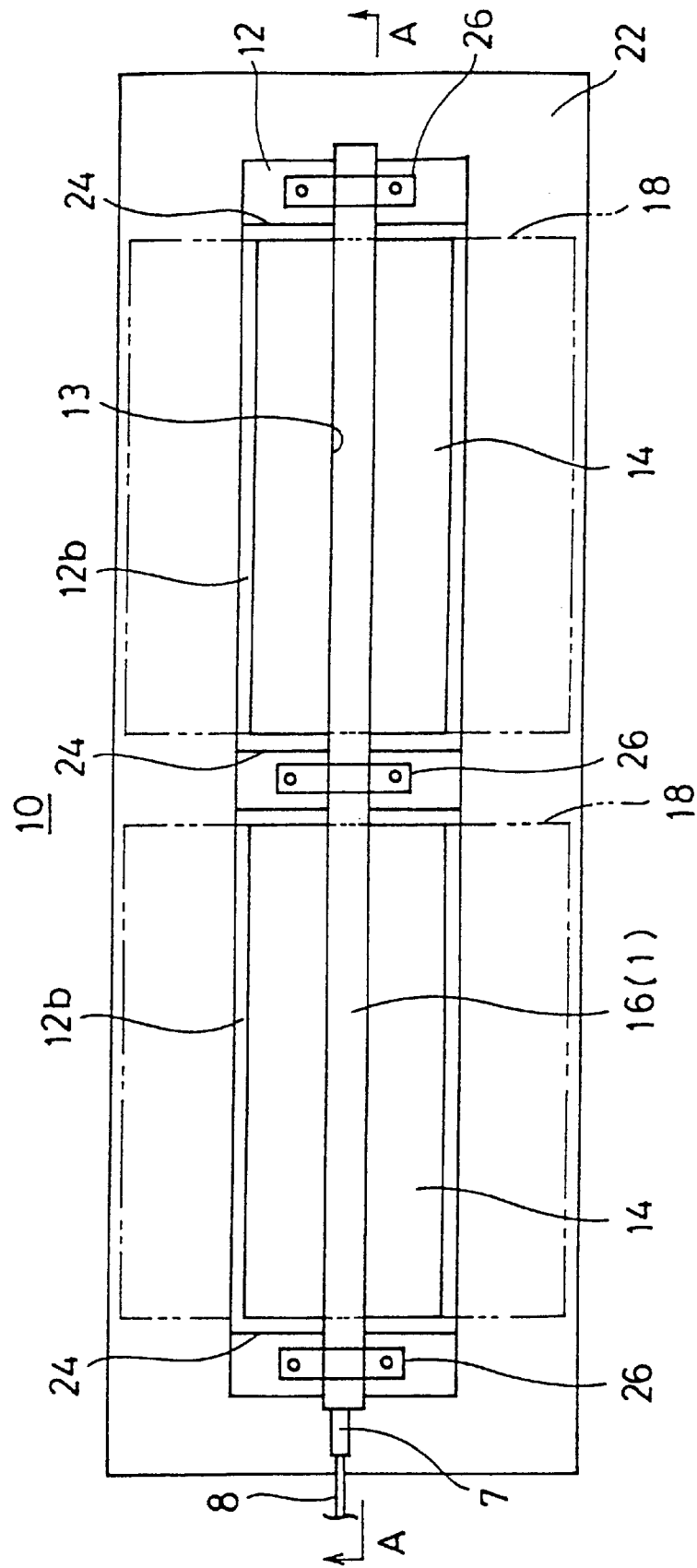
FIG. 8 is a plane view of the heating device (10).
Figure 9:
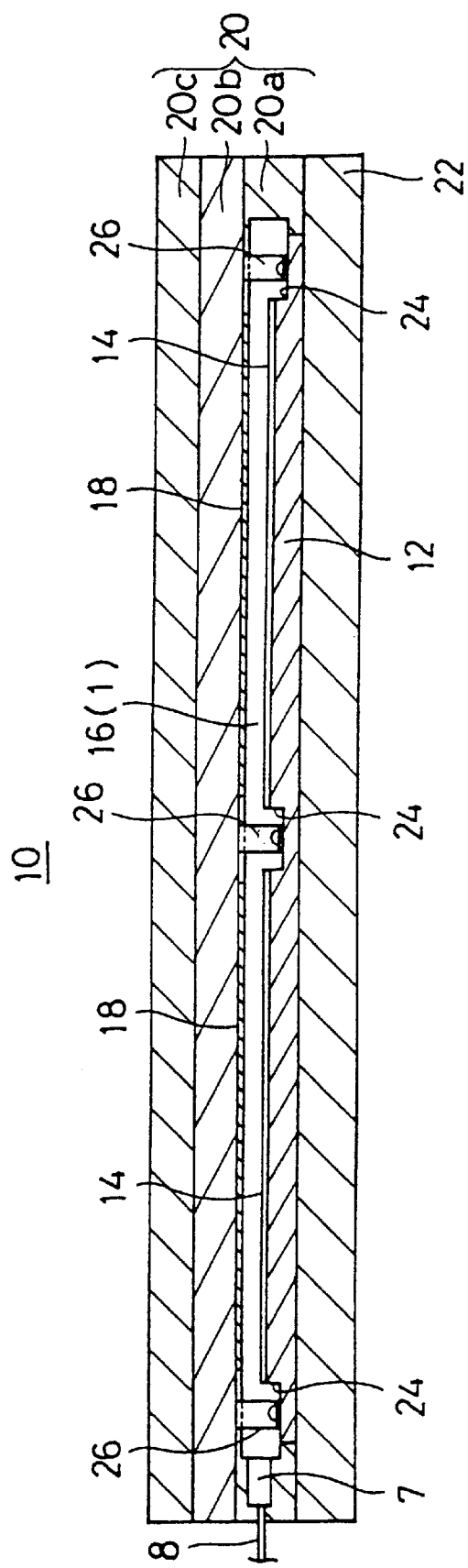
FIG. 9 is a sectional view taken along a line A—A of FIG. 8.

The heat insulating member (12) is a plate-like member formed in a rectangular shape and a groove (13) in a recess shape extended in the longitudinal direction is formed substantially at center of an upper face thereof. The heat insulating member (12) is a high pressure resistant heat insulating member and is integrally constituted by a heat insulating member (12a) in a planar shape constituting a lower layer and an upper layer of an insulating material (12b) for forming the groove (13). The upper layer of the heat insulating member (12b) is arranged in a state where it is divided in two in the longitudinal direction of the heat insulating member (12) by which as shown by FIGS. 8 and 9, recess portions (24) extended in the direction of a short side of the heat insulating member (12) are formed at three locations of the end portions and the central portion in the longitudinal direction of the heat insulating member (12). The recess portions (24) operate as wedges for preventing shift of the surface layer (20) in the horizontal direction by putting the surface layer (20) thereinto. Further, it is preferable that pressure resistant strength of the heat insulating member (12) is 15 through 90 kg/cm$^2$ and the specific weight is 1.0 through 1.5 g/cm$^3$ to maintain the strength of the road structure.

The heat diffusing plate (14) is arranged to cover the upper face of the heat insulating member (12), in details, the upper face of the upper layer of the heat insulating member (12b) substantially over its entire region and both are constituted as a heat diffusing and heat insulating board by being integrated together. The heat diffusing plate (14) is a metal plate comprising copper, aluminum or the like and is provided with pertinent thermal conductivity and thickness for sufficiently diffusing energy generated from the heat generating body (16) at surrounding along the upper face of the heat insulating member (12). A far infrared emissive layer constituted by coating a paint containing the above-described far infrared emissive material is formed on the upper face of the heat diffusing plate (14). Or, the surface of the heat diffusing plate (14) may be subjected to oxidation processing to thereby form the far infrared emissive layer. The far infrared emissive layer is heated by energy supplied from the heat generating body (16) and radiates far infrared ray to the upward direction over a wide area.

The heat generating body (16) constitutes a cylindrical shape extended along the longitudinal direction of the heat insulating member (12) and is arranged in the groove (13) of the heat insulating member (12). According to the embodiment, the heat storing type heat generating body (1) of FIG. 4 mentioned above is used as the heat generating body (16).

Figure 6:
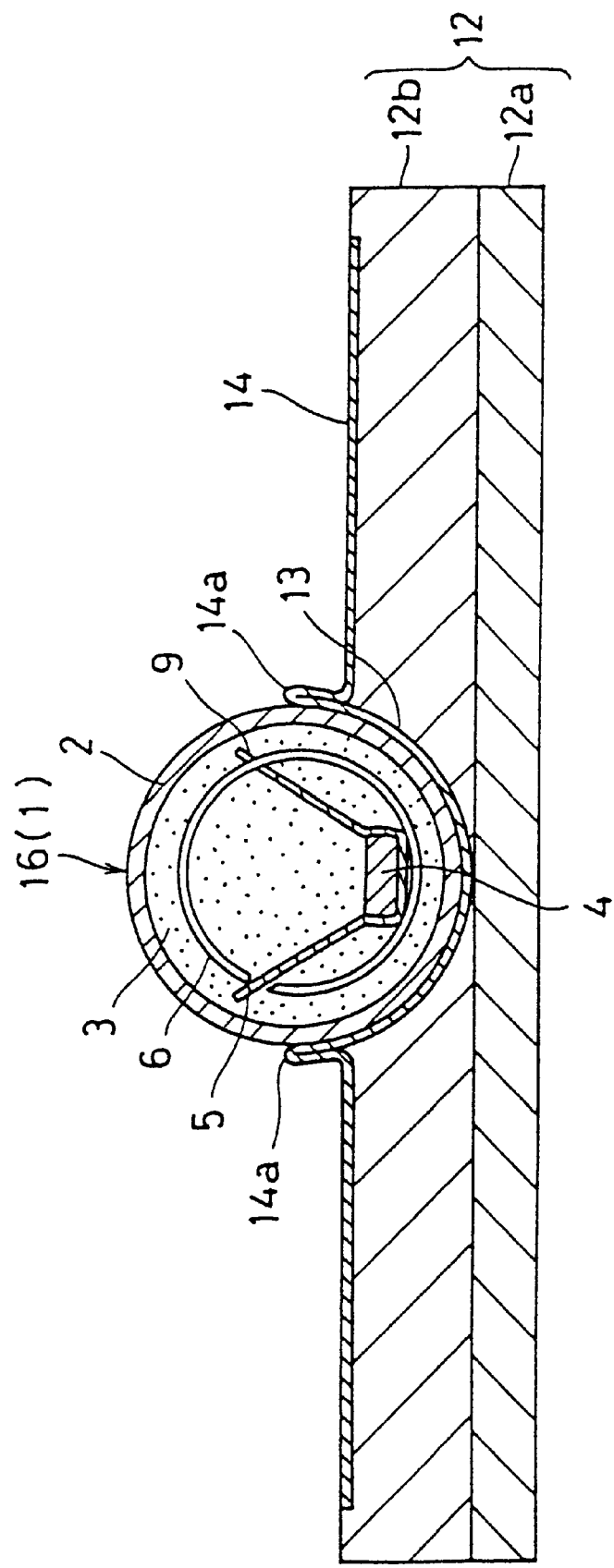
FIG. 6 is a sectional view enlarging essential portions of the heating device (10).

As shown by FIG. 6, the bottom portion of the heat generating body (16) is arranged in the groove (13) and a remaining portion thereof is arranged to project upwardly from the upper face of the heat insulating member (12). The bottom portion of the heat generating body (16) arranged in the groove (13) is brought into contact with the heat diffusing plate (14) arranged on the heat insulating member (12). Thereby, heat on the side of the bottom portion of the heat generating body (16) is diffused in the lateral direction and effective use of energy generated from the heat generating body (16) is achieved. Further, the heat diffusing plate (14) is formed with projected extension portions (14a) constituted by being extended upwardly and folded back along the heat generating body (16) at both side portions of the groove (13). Thereby, a contact area of the heat diffusing plate (14) contacting with the heat generating body (16) is increased and heat diffusing effect in the lateral direction can be promoted. Further, light weight formation of the device can be achieved by reducing the thickness of the heat insulating member (12) and accordingly, the structure is excellent in operational performance and cost. When the extension portions (14a) are provided, it is preferable to design such that the heat diffusing plate (14) is brought into contact with 40% or more of the surface of heat generating body (16).

The heat generating body (16) is fixedly brought into close contact with the heat insulating member (12) and the heat diffusing plate (14), at the recess portions (24) of the heat insulating member (12), by fastening members (27) such as concrete nails or the like via fixing bands (26). The fastening members (27) are struck into the base layer (22) by penetrating the heat insulating member (12). In this manner, the heating device (10) is fixed to the base layer (22). In this case, the base layer (22) is referred to as a layer normally blended with a filler.

Figure 7:
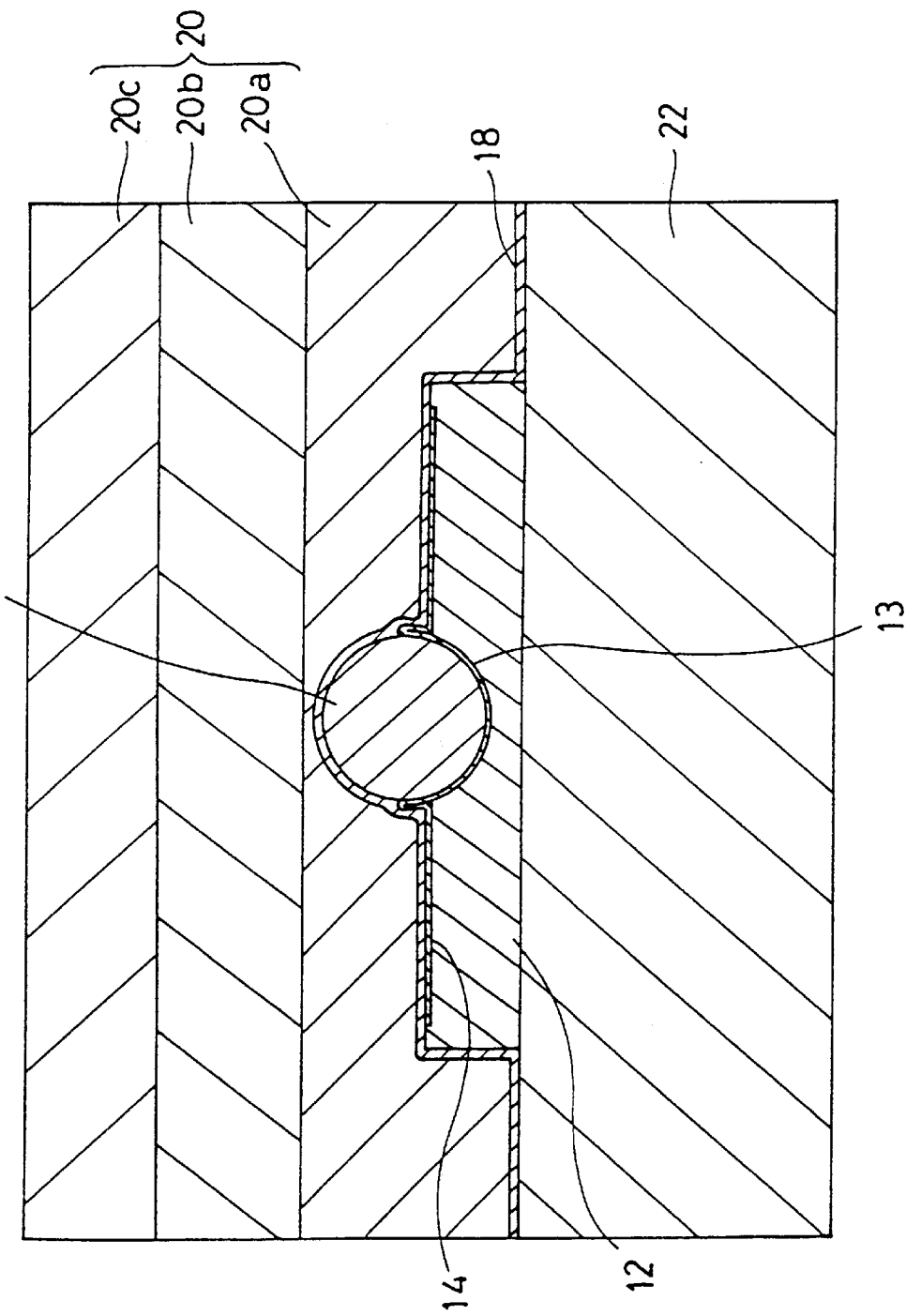
FIG. 7 is a sectional view of the heating device (10).

The protective sheet (18) is formed as follows: The above-described far infrared emissive material is admixed to petroleum asphalt while being heated; The obtained mixture liquid is impregnated to base stuff or supporting fabric in a sheet-like shape. The protective sheet (18) is provided with thermal conductivity, far infrared ray radiation function, tensile strength, and thermal fusion performance that shows fusion performance at a predetermined temperature or higher. As shown by FIGS. 7 and 8, the protective sheet (18) is arranged to totally cover the upper face of the heat diffusing plate (14) arranged on the heat insulating member (12) from above the heat generating body (16). Further, both side portions thereof are extended to above the base layer (22). In work of laying the surface layer (20) comprising asphalt, the protective sheet (18) can exhibit the fusion performance by heat of asphalt-road-paving material so that the heat insulating member (12) and the heat generating body (16) are fixedly bonded with ease onto the base layer (22) and onto the surface layer (20) while the base layer (22) and the surface layer (20) are surely and fixedly bonded to each other.

The surface layer (20) is an asphalt layer comprising three layers of a protective layer (20a), an intermediary layer (20b) and a surface layer (20c) from below. The surface layer (20) is admixed by a far infrared emissive material having an absorption band at wavelength range of far infrared ray radiated from the heat generating body (16), the heat diffusing plate (14) and the protective sheet (18). There are quartz-base volcanic rock, Manchu talc, fly ash and so on as such far infrared emissive material.

According to the heating device (10), energy generated from the heat storing type heat generating body (1) constituting the heat generating body (16) is transferred from the far infrared emissive layer of the heat storing vessel (2) to the protective sheet (18) and the heat diffusing plate (14) by radiation and contact heat conduction. Energy absorbed by the heat diffusing plate (14) is transferred by radiation and contact conduction of heat to wide area of the surface layer (20), from the far infrared emissive layer of the heat diffusing plate (14) which is widely extended in the lateral directions. Far infrared ray radiated from the far infrared emissive layer of the heat diffusing plate (14) is converted into far infrared ray (electromagnetic wave) having a maximum at 10 μm region. Then, the far infrared ray radiated from the heat diffusing plate (14) is transferred to the far infrared emissive material of the protective sheet (18) and the surface layer (20). After repeating reradiation and absorption, the far infrared ray is radiated from the surface layer (20c) to snow, ice, human body or the like.

For example, snow and ice efficiently absorbs the far infrared ray of 10 μm wavelength region and is rapidly melted. Naturally, elevation of road surface temperature by heat conduction serves for melting snow. That is, for heat transfer in the heating device (10), radiation transfer by far infrared ray radiation is a major contributor while heat conduction as an auxiliary contributor.

According to the above-described heating device (10), energy generated from the heat storing vessel (2) can be rapidly spread in upward and lateral directions, as a result of downward insulation of heat and heat diffusion effect. At the same time, by energy supplied from the heat storing vessel (2), the far infrared emissive layer on the heat diffusion plate (14) keeps a stable temperature and can stably radiate far infrared ray, having a maximum at 10 μm wavelength region, over a wide range under a road surface. Therefore, temperature is elevated more swiftly than in a conventional general snow melting device, a snow-melting-area can be enlarged 1.5 times as much as that in the conventional snow melting device so that outdoor use of the heat storing type heat generating body (1) can be made further effective.

Figure 10:
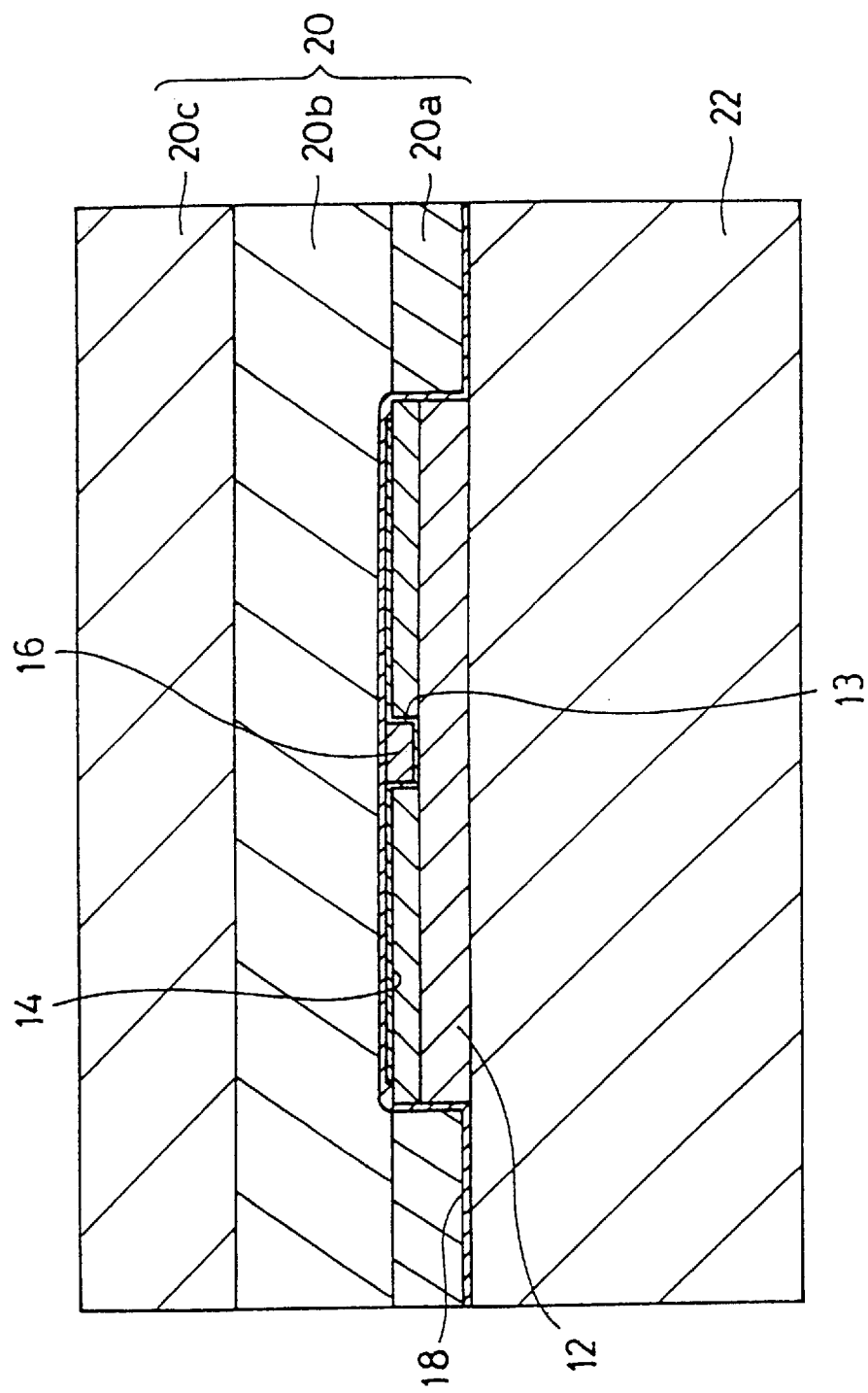
FIG. 10 is a sectional view of a heating device (30) according to other embodiment of the present invention.

FIG. 10 is a heating device (30) according to other embodiment. According to the heating device (30), in the above-described heating device (10), instead of using the heat storing type heat generating body (11) as the heat generating body (16), a tape-like heater having the PTC characteristic is used. That is, the heat generating element (4) itself within the heat storing type heat generating body (1) is used as the heat generating body (16). As shown by the drawing, the section of the groove (13) on the upper face of the heat insulating member (12) is formed substantially in a rectangular shape, while the heat generating body (16) is arranged in the groove (13), such that a bottom face and both side faces of the groove (13) (other than its upper face) are brought into contact with the heat diffusing plate (14). The heat generating body (16) which is used in a heating device is not limited to a heat storing type heat generating body.

In following, the constitution of the protective sheet (18) will be described.

Petroleum asphalt is used for providing the protective sheet with thermal fusion performance. Straight asphalt and blown asphalt are common petroleum asphalt. However, according to the present invention, it is preferable to use semi-blown asphalt which is produced by modifying straight asphalt by slightly blowing heated air. As a result of this modification, semi-blown asphalt has a softening point higher than that of straight asphalt, reduced elongation, enhanced bonding strength. Therefore, when semi-blown asphalt is used for the protective sheet, it shows excellent capabilities. In this case, it is preferable to use semi-blown asphalt having a softening point of 80 through 100° C., penetration (25° C.) of 40 (1/10 mm) or higher, a viscosity (180° C.) of 200 cSt (mm²/s) or lower.

Further, for use in roof snow melting in general, floor heating at facilities, or the like, the thermal fusion strength of comparatively reduced value is enough. In some cases, protective sheet which is not so much sticky is required in view of operational performance. In another case, a protective sheet which has comparatively high heat resistant temperature or pertinent heat insulating performance is required. In such cases, a protective sheet which meets such a request can be formed by using blown asphalt as petroleum asphalt and admixing one kind or two kinds or more of modifiers—thermoplastic elastomer such as ethylene-vinyl acetate copolymer (EVA) or the like, petroleum resin, urethane resin and so on—to a mixture liquid by a pertinent amount.

When such a modifier is used, a mixture liquid in which admixed materials are uniformly dispersed can swiftly and easily be obtained by following steps: a far infrared emissive material, graphite or the like is added to the modifier in advance; the modifier is palletized by a kneading extruder to a shape and a size which is easy to be melt; a pertinent amount of the modifier is added and stirred with molten asphalt.

The far infrared emissive material is added to provide the protective sheet with high far infrared ray radiation function. It is preferable to select the far infrared emissive material having a high radiation rate at around 10 micrometers as mentioned above in purpose of use such as snow melting, prevention of freeze or heating room.

It is preferable that the particle size of the far infrared emissive material is 5 μm or smaller. The reason is as follows: When the particle size exceeds 5 μm, in admixing with liquefied petroleum asphalt, the far infrared emissive material is difficult to disperse uniformly in petroleum asphalt owing to a difference between specific gravity; In producing the protective sheet, a sheet uniformly dispersed with the far infrared emissive material cannot be obtained because the far infrared emissive material is precipitated to separate from petroleum asphalt. In view of bringing out the far infrared emission capabilities effectively, it is preferable that an amount of admixing the far infrared emissive material is 5 through 40 weight parts in relation to 100 weight parts of petroleum asphalt.

It is preferable to admix graphite having the highest thermal conductivity among nonmetallic solids, for example, graphite having the thermal conductivity of 90 through 120 kcal/mh° C. to the mixture liquid. The reason is as follows. The above-described petroleum asphalt is inferior in thermal conduction capability as its thermal conductivity is about 0.12 through 0.15 kcal/mh° C. in a normal temperature range (for example, 0 through 70° C.). However, by adding graphite, the thermal conduction capability of the protective sheet is improved so that further preferable sheet can be formed for melting snow or heating floor.

The admixing of graphite is advantageous not only in view of improvement of the thermal conduction capability but also in view of providing significant effect of promoting the radiant exitance (w/m²) of far infrared ray by improving temperature elevation on the surface of the protective sheet. In view of effectively achieving such an effect, the amount of admixing graphite is preferably 5 through 50 weight parts in relation to 100 weight parts of petroleum asphalt.

The base stuff for being impregnated with the mixture liquid is used for promoting tensile strength of the protective sheet and plays a role of protecting particularly the surface layer and the heat source portion from force operating in shear direction thereof.

As such a base stuff, a fiber structure or fabric in a sheet-like shape of nonwoven cloth, woven cloth, felt or the like can be used. As a material for fiber in the base stuff, synthetic fiber is preferable. Synthetic resin having a high infrared ray absorption at around 10 micrometers, for example, polypropylene, vinyl chloride or the like is especially preferable to use. For example, while polypropylene fiber has a low far infrared ray absorption at around 7 micrometers, the absorption efficiency is increased with shift of wavelength towards region of 8 micrometers or larger which corresponds to a lower temperature. Therefore, when the protective sheet is used in a system in which a heat source portion radiates far infrared ray having a maximum absorption at wavelength region of about 10 micrometers, the far infrared ray can be absorbed and reradiated efficiently.

The base stuff can pertinently be selected in accordance with use of the protective sheet. For example, when the protective sheet is used in facilities in which heavy load is applied on a surface layer as in melting snow on a road, a parking lot, a harbor, air port facilities or the like, or in floor heating of various factory facilities, nonwoven cloth, particularly bulky nonwoven cloth formed by needle punch process is preferable. Meanwhile, when the protective sheet is used in facilities in which heavy load is not applied on a surface layer as in melting snow on a footway or a roof, floor heating in general facilities or the like, woven cloth which is not bulky is preferably used.

The ratio of impregnating a mixture liquid to a base stuff [(weight of mixture liquid/weight of base stuff)×100] is not particularly limited but can be set pertinently in accordance with kind of the base stuff and use of the protective sheet. For example, when bulky nonwoven cloth is used for melting snow on a road, 700 through 800% is preferable and when woven cloth is used for melting snow on a footway or floor heating, 250 through 300% is preferable.

It is preferable that a thickness of the protective sheet is 2 mm or smaller in view of highly holding the far infrared ray radiation intensity. When the thickness of the protective sheet is set to about 1 through 2 mm, bulky nonwoven cloth is preferably used as the base stuff. For example, it is appropriate that the thickness is about 2 mm for a road on which heavy vehicles pass and it is about 1 mm for a parking lot or various factory facilities. Meanwhile, when the thickness of the protective sheet is 1 mm or smaller, it is preferable to use woven cloth as the base stuff. For example, it is appropriate that the thickness is about 0.5 mm for a footway or a roof for a general house.

In respect of the protective sheet, the far infrared emissive layer may be formed by coating a mixture of petroleum asphalt and far infrared emissive material on a face or both faces thereof by which the protective sheet may be formed as a sheet having a double layer structure. When further fusion integration strength is required for the protective sheet, by increasing the thickness of the sheet, the fusion integration strength can be promoted. However, by only increasing the thickness, surface temperature of the protective sheet is lowered and the far infrared ray radiation effect is lowered. In such a case, the above-described double layer structure is advantageous in view of promoting fusion integration strength without lowering the far infrared ray radiation effect. Further, as a mixture for being coated on the protective sheet, the above-described mixture liquid for impregnating the base stuff can be used.

In such multiple layer structure, following is preferable: a larger admixing amount of graphite and a smaller admixing amount of far infrared emissive material are set in a mixture liquid for impregnating the base stuff, to thereby constitute a sheet mainly for thermal conduction; content of far infrared emissive material in the mixture coated on the surface of the sheet is larger than that of the mixture liquid impregnating the base stuff. For example, it is preferable that 5 through 40 weight parts of far infrared emissive material and 20 through 50 weight parts of graphite are admixed to 100 weight parts of petroleum asphalt for a mixture liquid impregnated to the base stuff and 20 through 40 weight parts of far infrared emissive material and 5 through 20 weight parts of graphite are admixed to 100 weight parts of petroleum asphalt for a mixture coated on the surface of the sheet. Thereby, the surface temperature of the protective sheet is elevated and absolute temperature of the far infrared ray layer on the surface of the protective sheet is elevated. As a result, the radiant exitance of far infrared ray is promoted and other excellent radiation effect is achieved.

Further, the method of impregnating the base stuff with the mixture liquid is not particularly limited and various publicly-known methods can be used.

When the surface layer (20) is formed by asphalt-road-paving material as mentioned above, by carrying out paving work by laying the protective sheet on the heat generating body (16) and mounting heated asphalt-road-paving material thereon, whole road-paving material inside a road can be fused and integrated.

Meanwhile, when the surface layer (20) is formed by a surface layer material such as concrete, mortar or the like, by use of an adequate primer for the surface layer material, thermal fusion by the protective sheet can be carried out.

Further, when semi-blown asphalt is used for the protective sheet, although it is not the same as asphalt-road-paving material using straight asphalt, materials of basically same kind are used in a road construction work. Accordingly, when temperature of asphalt-road-paving material is 130° C. at the road construction work, the protective sheet can be fused and integrated with the other road-paving material inside a road sufficiently and easily by normal construction procedure. The quality of semi-blown asphalt is more excellent than quality of road-paving petroleum asphalt for general asphalt pavement, in view of thermal characteristics, the elongation or the like. For example, the quality of semi-blown asphalt is as follows—the penetration (25° C.) is 40 (1/10 mm), the softening temperature is 90° C. and the elongation (0° C.) is 2.0 cm. Meanwhile, for example, the quality of Mitsubishi straight asphalt 60–80 (for flow resistant formation) is as follows—penetration (25° C.) is 66 (1/10 mm), the softening point is 47.5° C. and the elongation (15° C.) is 140 cm or larger. Therefore, when the heat source portion is fixedly integrated to the surface layer and the base layer by thermal fusion by the protective sheet using semi-blown asphalt, it seems that excellent protection and strengthening are provided in respect of heat, impact, vibration and slip.

An explanation will be given of embodiments of the present invention as follows.

Embodiment 1

Figure 11:
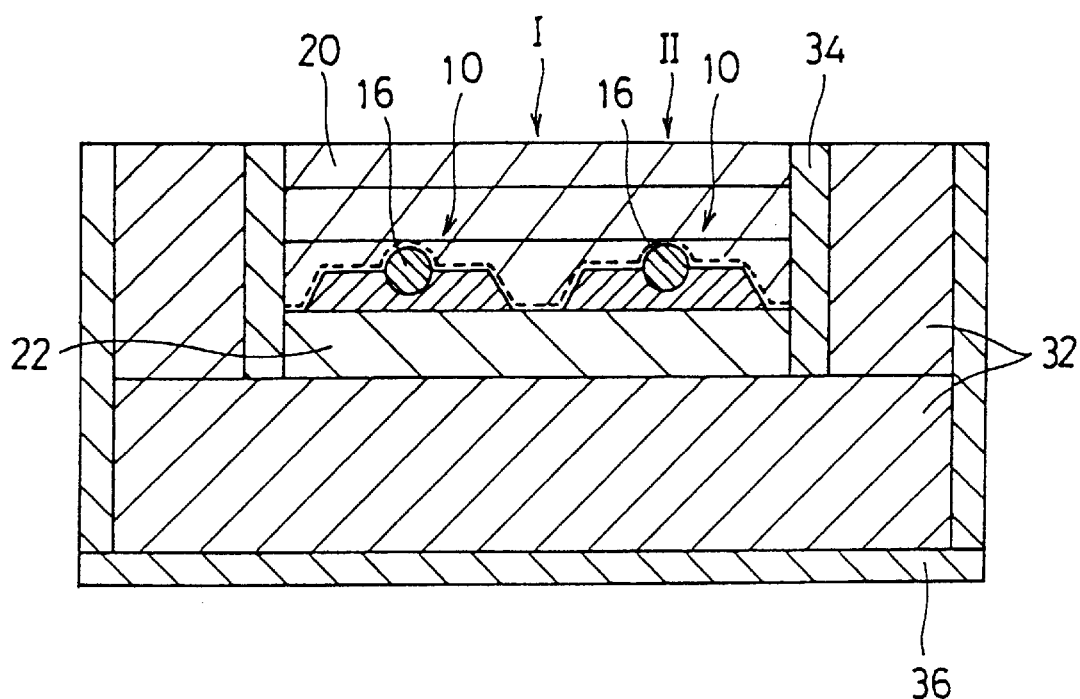
FIG. 11 is a sectional view of a test body A according to Embodiment 1.

Assuming an asphalt-paved road, a test body A of asphalt having a width of 310 mm, a length of 900 mm and a thickness of 140 mm is prepared. As shown by FIG. 11, two of the heating devices (10) are aligned and embedded in the asphalt test body. In this case, an interval of the two heat generating bodies (16) is set to 150 mm and a distance between the road surface and an upper face of the heat generating body (16) is set to 60 mm. Further, the bottom face of the asphalt unit is thermally insulated by a heat insulating member (32) (thermal conductivity; 0.027 kcal/mh° C.) having a thickness of 100 mm, while side faces of the test body are thermally insulated by the same member having a thickness of 75 mm. Outer sides of the insulating member is surrounded by a wood frame (36). Further, resin foam (34) are interposed between the side faces of the asphalt unit and the heat insulating member (32).

A specific constitution of the test body A is as follows.

Heat insulating member (12): a highly pressure resistant heat insulating board (thickness; 20 mm) having a pressure resistant strength of 26 kg/cm$^2$ formed by compressing residual of industrial waste including polyester, vinyl chloride, calcium carbonate or the like.

Heat diffusing plate (14): copper plate (thickness; 0.5 mm) coated with a thin film of an aqueous latex resin-base coating material including far infrared emissive material (quartz-base volcanic rock).

Heat generating body (16): Heat storing type heat generating body (1) shown by FIG. 4.

Heat storing vessel (2) high density cross-linked polyethylene pipe (made by Mitsubishi Sanshi Kabushiki Kaisha: commercial name; Yukaron excel pipe) having an outer diameter of 27 mm and a length of 800 mm which is coated with a ceramic coating agent (made by Span World Co., Ltd.: commercial name; Tempcoat) admixed with a far infrared ray radiation agent (quartz-base volcanic rock) by a thickness of about 10 μm.

Heat storing agent (3): a mixture of (a) polyethylene glycol having a melting temperature of about 23° C. and (b) polyethylene glycol having a melting temperature of about 42° C. (mixing ratio (a)/(b)=40/60) admixed with 3% of the above-described infrared emissive material.

Heat generating element (4): tape-like heater made by Raychem Co., Ltd. having a width of 12 mm, a thickness of 6 mm and a length of 610 mm and having PTC characteristic of voltage for use of 200 V and power consumption of 85 W/m.

Heat radiating plate (5): copper plate having a thickness of 0.3 mm coated with a thin film of a coating material including far infrared emissive material (quartz-base volcanic rock).

Heat radiating metal line (6): steel wire (diameter; 0.8 mm) coated with a thin film of a coating material including far infrared emissive material (quartz-base volcanic rock).

Protective sheet (18): polyester-base nonwoven cloth impregnated with the mixture of petroleum asphalt and far infrared emissive material, where petroleum asphalt/far infrared emissive material=100 weight parts/25 weight parts (thickness; 1 mm, impregnation rate=750%).

Surface layer (20): road-paving material admixed by far infrared emissive material whose major component is silicon dioxide, at about 7% weight ratio based on the road-paving material.

COMPARATIVE EXAMPLES 1 and 2

A test body B is formed as Comparative Example 1, while a test body C is formed as Comparative Example 2. They are respectively formed as asphalt test body similar to the test body A of Embodiment 1.

According to the test body B, a high density polyethylene pipe similar to that in the test body A is used, only one kind of a heat storing agent of polyethylene glycol having a melting temperature of 41° C. (far infrared emissive material is not admixed) is enclosed in a heat storing vessel. The surface of the heat storing vessel is protected against heat by an aluminum foil having a thickness of 15 μm while a heat generating body formed by inserting a PTC tape-like heater the same as that in the test body A is mounted on a heat insulating plate. The heat generating element is not mounted with heat radiating plates and a heat radiating metal line. A heat diffusing plate and a protective sheet are not used. Further, far infrared emissive material is not admixed to the surface layer.

The test body C is a conventional general snow melting structure in which only a PTC tape-like heater the same as that in the test body A is attached to a welded metal net installed on an asphalt base layer and the surface layer is paved. The surface layer is not admixed by far infrared emissive material.

TEST EXAMPLE 1

The three test bodies A, B and C prepared in this way are parallelly placed in an artificial weather chamber and a snow melting experiment is conducted.

Figure 12:
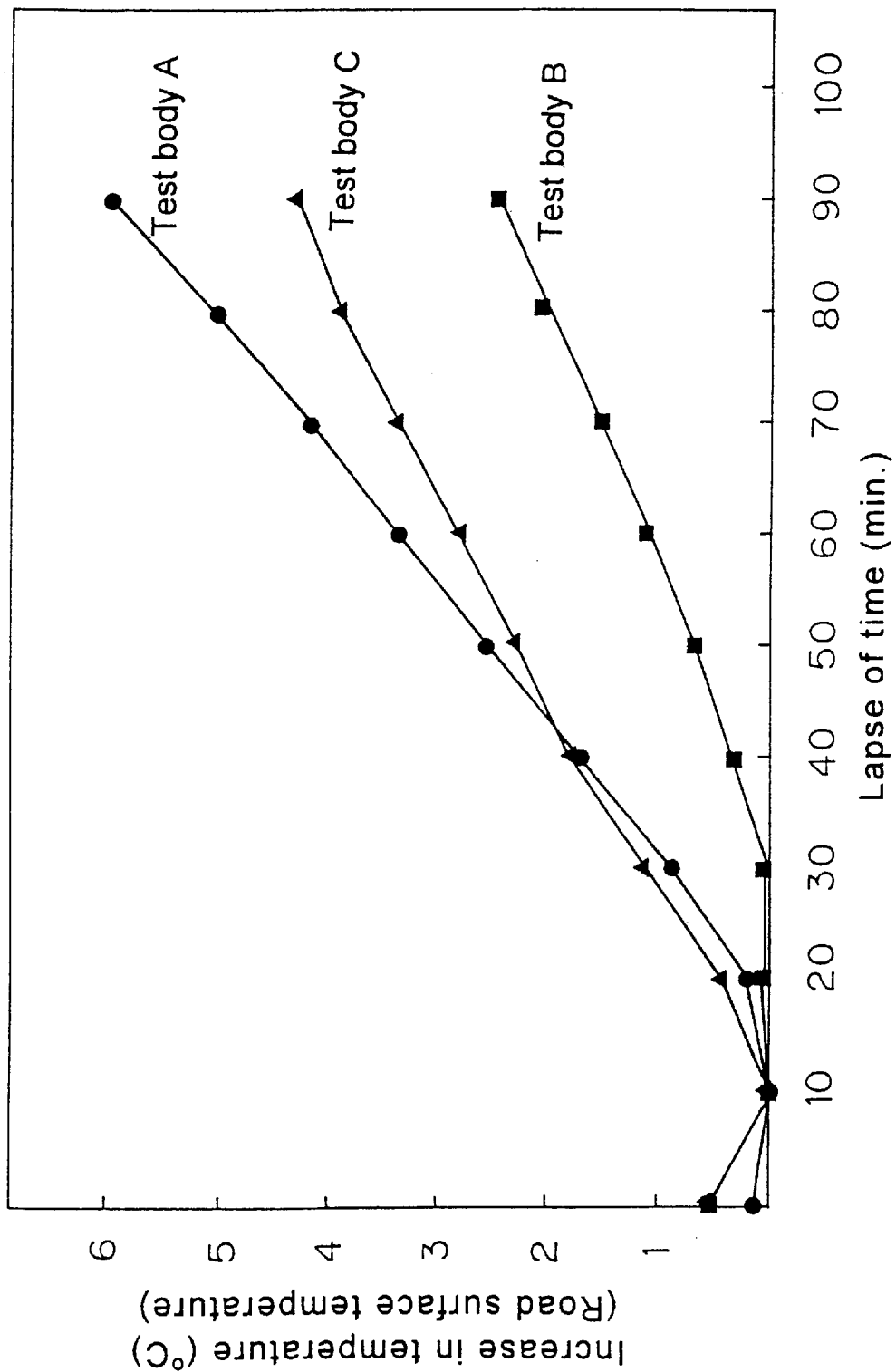
FIG. 12 shows graphs indicating rise of road surface temperatures of respective test bodies according to Test Example 1.

FIG. 12 shows rise of road surface temperatures of the respective test bodies from start of electricity conduction to elapse of 90 minutes, showing an experimental result with set conditions of temperature of −20° C. and no snow fall in the artificial weather chamber.

According to the test body A, the road surface temperature is elevated by 0.8° C. after elapse of 30 minutes from start of electricity conduction and by 3.4° C. after elapse of 60 minutes. According to the test body B, the road surface temperature is elevated only by 0.1° C. after elapse of 30 minutes from start of electricity conduction and by 1.15° C. after elapse of 60 minutes. According to the test body C, the road temperature is elevated by 1.2° C. after elapse of 30 minutes from start of electricity conduction and by 2.8° C. after elapse of 60 minutes.

From the result, it is known that, by the test body A of Embodiment 1, elevation of the road surface temperature is substantially equivalent to or more than that of the test body C having the conventional snow melting structure in the initial starting regardless of the heat storing system.

Although the test body B is provided with the heat storing system similar to that of the test body A, as mentioned above, only one kind of the heat storing agent is put into the heat storing vessel, the heat generating body is inserted thereinto. Further, system formation of admixing the far infrared emissive material to the heat diffusing plate, the protective sheet and the surface layer is not carried out. For this reason, compared with the test body A, elevation of the road surface temperature for test body B is significantly delayed in comparison with the conventional snow melting structure.

Particularly, temperature of the heat storing agent of the test body B is elevated only to 34.4° C. even after elapse of 30 minutes and does not reach the melting temperature 41° C. of the heat storing agent. That is, the stage of absorbing latent heat energy is not reached and under the state, reduction to practice is determined to be difficult. Meanwhile, the temperature of the heat storing agent of the test body A after elapse of 30 minutes is 48.4 ° C. which significantly exceeds the melting temperature, showing further elevation to a high temperature region after finishing absorption of latent heat and an effect of rapidly elevating the temperature at inside of the road-pavement is achieved.

TEST EXAMPLE 2

Figure 13:
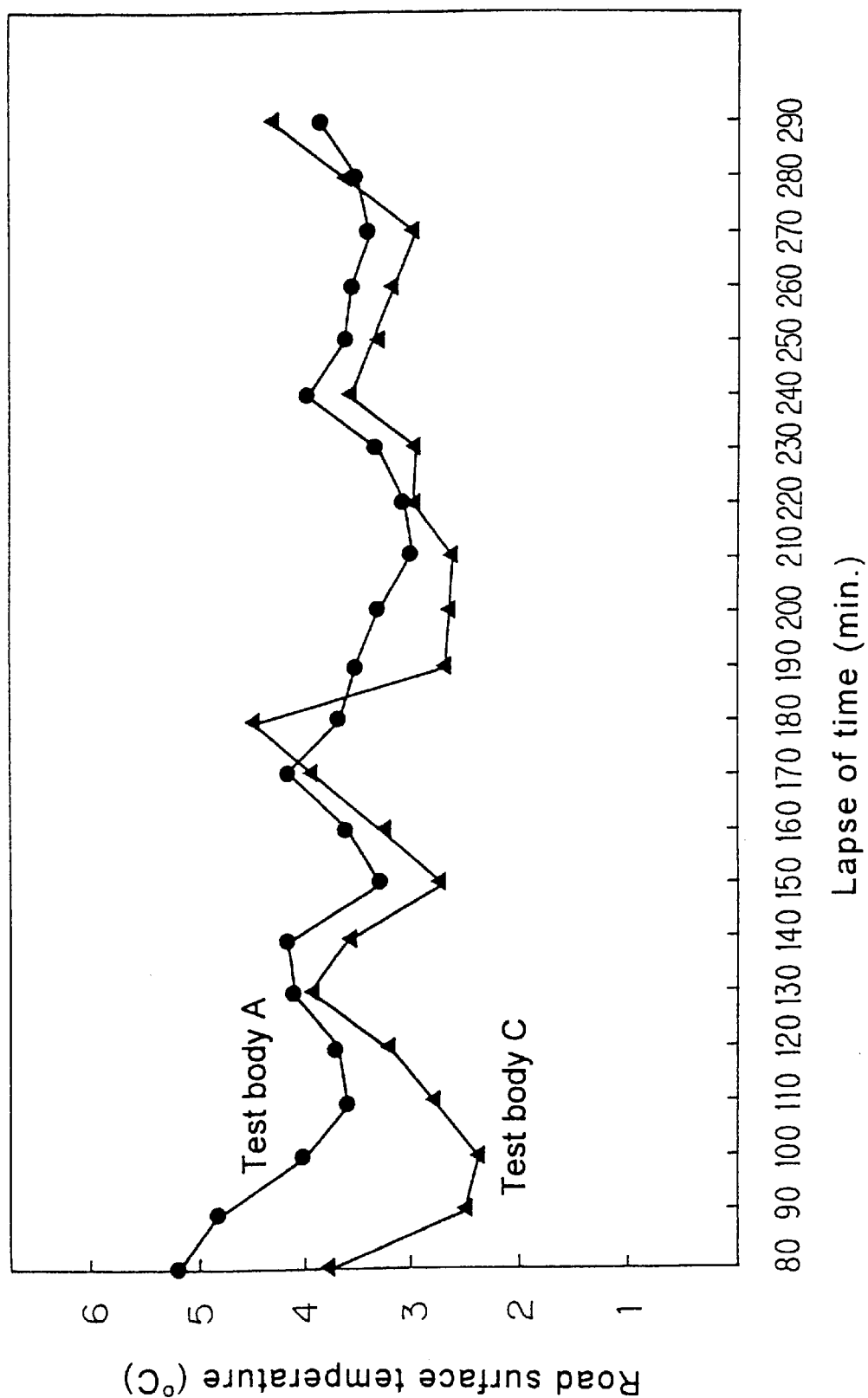
FIG. 13 shows graphs indicating road surface temperature holding characteristics of respective test bodies according to Test Example 2.

A road temperature holding characteristic is investigated under conditions of outer air temperature of −10° C. and with snowfall in respect of the test bodies A and C. The result is shown by FIG. 13.

According to the test body A, the road surface temperature is elevated to 5.2° C. after elapse of 80 minutes from start of electricity conduction. At the time point, snowfall is started and electricity conduction is made OFF. As a result, the road surface temperature is lowered to 3.6° C. Further, the experiment is conducted with ON-OFF of electricity conduction at 30 minutes interval, that is, 50% of electricity conduction rate. As a result, the road surface temperature is maintained at 4.2 through 3.0° C.

According to the test body C, the road surface temperature is elevated to 3.75° C. after elapse of 80 minutes from start of electricity conduction and at the time point, snowfall is started. As a result, the road surface temperature is lowered to 2.4° C. and thereafter, road surface temperature is maintained at 4.5 through 2.6° C. However, the experiment is conducted in respect of the test body C with the electricity conduction rate of 100%.

As a result, regardless of the fact that the electricity conduction rate is 50%, in the case of the test body A, the road surface temperature is maintained at temperature which is higher than that of the test body C with the electricity conduction rate of 100% on an average. That is, when the test body A is utilized as a snow melting facility, even in snowfall, an alternate ON-OFF electricity conduction to each 50% area of a whole heat generating bodies (snow melting area) laid on the road. That is, the test body A can be used by setting the electricity receiving capacity at ½ of the total electricity capacity of all the heaters built as laid down in road-pavement.

TEST EXAMPLE 3

The test bodies A and C are brought under an atmosphere at −10° C. and a distribution of road surface temperature after elapse of 60 minutes from start of electricity conduction is measured under a condition of no snowfall, that is, no artificial snowfall. Further, a distribution of road surface temperature after elapse of 120 minutes from start of electricity conduction is measured under a condition of snow fall by artificial snowfall. The result is shown by Table 1. With regard to points of measuring of road surface temperature of the respective test bodies A and C, a measuring point (I) is disposed above the position of an intermediary between two heat generating bodies and a measuring point (II) is disposed right above a heat generating body.

TABLE 1

| | Road surface temperature | | | |
|---|---|---|---|---|
| | Test body A | | Test body C | |
| | Measuring point (I) | Measuring point (II) | Measuring point (I) | Measuring point (II) |
| No snowfall after 60 minutes from electricity conduction | 5.4° C. | 5.6° C. | 4.4° C. | 5.8° C. |
| With snowfall after 120 minutes from electricity conduction | 3.8° C. | 3.8° C. | 2.25° C. | 3.9° C. |

According to the table, under the condition of no snowfall, after elapse of 60 minutes from electricity conduction, the road surface temperature of the test body A is 5.4° C. at measuring point (I) and 5.6° C. at measuring point (II) and almost no temperature difference is caused.

Meanwhile, the road surface temperature of the test body C is 4.4° C. at measuring point (I) and 5.8° C. at measuring point (II), and the temperature difference is significant. Further, under the condition of snowfall, after elapse of 120 minutes from electricity conduction, the road surface temperature of the test body A is 3.8° C. at measuring point (I) and. 3.8° C. at measuring point (II) whereas the road surface temperature of the test body C is 2.25° C. at measuring point (I) and 3.9° C. at measuring point (II) and the distribution of the road surface temperature of the test body A is more uniform. From the result, it becomes clear that effective snow melting effect is achieved in the test body A since the radiation and transfer of far infrared ray is operated uniformly and efficiently. At the same time, the fact that the temperature at the intermediary between the heat generating bodies of the test body A is higher than that of the test body C, signifies that in the actual use, snow melting can be carried out even when intervals of disposing or laying of the heat generating bodies are made wider than that of a general snow melting system. According to the experiment, the interval between the heat generating bodies of the test body A is set to 150 mm. However, as known from comparison among elevated temperatures on the road surface, the interval between the heat generating bodies can sufficiently be widened to 200 mm or more. Accordingly, it becomes clear that the test body A can be handled with a disposing or laying density at 75% or lower of that of the conventional snow melting structure of the test body C.

TEST EXAMPLE 4

Figure 14:
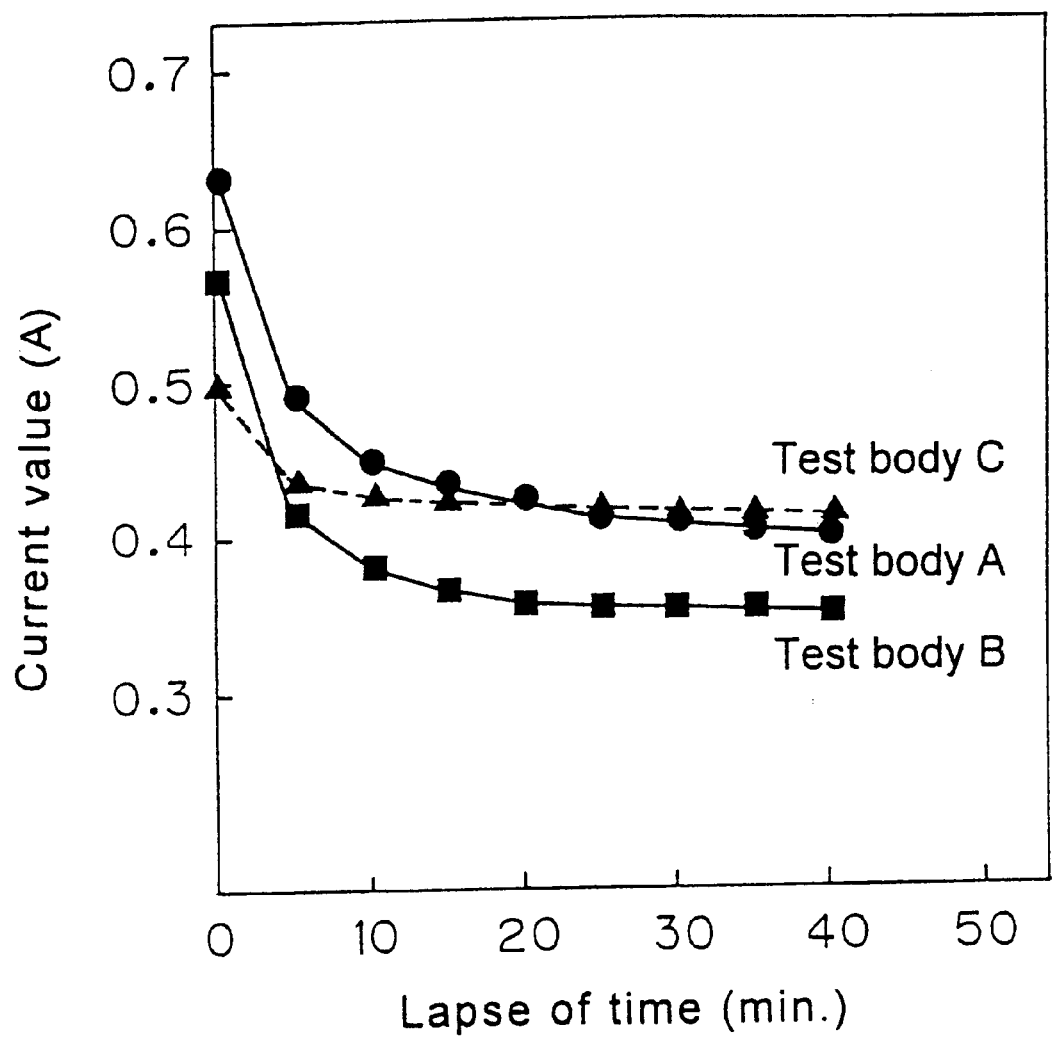
FIG. 14 shows graphs indicating current value varying characteristics of respective test bodies according to Test Example 4.

An investigation is carried out on a change in a current value in initial operation under conditions of out-door air temperature of −10° C. and no snowfall in respect of the test bodies A, B and C. The result is shown by FIG. 14.

According to the test body A, the current is 0.63 A immediately after electricity conduction, 0.425 A after elapse of 20 minutes, and 0.40 A after elapse of 40 minutes. According to the test body C, the current is 0.5 A immediately after electricity conduction, 0.425 A after elapse of 20 minutes and 0.415 A after elapse of 30 minutes, which is substantially the same as in the test body A. Meanwhile, according to the test body B, although the current is 0.57 A immediately after electricity conduction, the temperature is lowered to 0.36 A after elapse of 20 minutes and 0.35 A after elapse of 40 minutes.

From the test result, even with the heat storing system of the test body A, the current value which is not changed from that of the test body C having the conventional general snow melting structure is maintained. Meanwhile, the current value of the test body B is lowered to 84.7% of that of the test body A (15.3% reduction) after elapse of 20 minutes from electricity conduction, manifesting a drawback of lowering current of the heat generating body having the PTC characteristic by utilizing the heat storing agent.

As is apparent from the test result, it is known that in using the heat generating body having the PTC characteristic, even at outdoor, rapid temperature elevation and load variation (outer air variation, snowfall change) can be dealt with. Further, there can be used a facility for melting snow or heating in a heat storing type which is excellent in safety, economical and excellent in function.

From the above test result, according to the heating device (10) of the embodiment, the electricity receiving capacity can be set to ½ of that of the conventional general snow melting structure and the disposing or laying density can be set to 75% thereof. Further, snow can be melted with power consumption of about 37% or lower of the conventional general snow melting structure.

At this point, a theoretical study will be conducted on snow melting by the heating device (10).

According to the heating device (10), to-be-heated or heated object, that is an object of snow melting or heating, contains moisture. Accordingly, heating by far infrared ray radiation energy is effective. For example, in the case of snow and ice, water molecules are crystallized by hydrogen bonding and the water molecule $H_2O$ is an electrically polarized molecule in which oxygen atom is polarized to negative and hydrogen atom is polarized to positive in which far infrared ray wavelength of 3.51 through 14.3 μm constitute an absorption band. In the absorption band, the water molecule is provided with high absorption ranges in respective narrow regions of 3 μm and 6 μm and in a wider region around 10 μm. Meanwhile, far infrared ray energy is an electromagnetic wave progressing at light speed in which an electric field and a magnetic field intersect with each other and is alternating current energy in which the electric field is changed to plus and minus at $10^{13}$ times per second. As mentioned above, snow and ice is constituted by polarized molecules and accordingly, molecular motion is rapidly amplified by directly absorbing wavelength of far infrared ray with central wavelength of 10 μm radiated from the heating device (10). As a result, three-dimensional hydrogen bonding of snow and ice is separated and the crystal is rapidly collapsed and fluidized.

Such a snow melting system is basically different from the conventional snow melting system by thermal conduction. According to the heating device (10), by system formation of such far infrared ray radiation absorption, as shown by the above-described experimental results, snow can be melted with an amount of power consumption of about 37% or lower of that of the conventional thermal conduction snow melting system.

In order to achieve snow melting effect by far infrared ray, it is effective to combine the heat storing type heat generating body (1) and the heating device (10). The reason is that in the snow melting system mainly of using far infrared ray, it is important that stored heat energy is swiftly converted into far infrared ray, is radiated stably from a wide area and is absorbed by a to-be-heated or heated object with a least attenuation.

According to the heating device (10), by system formation of the heat storing type heat generating body (1) that enables rapid heat storing and the far infrared ray radiation function, the heat storing type heat generating body (1) can be utilized at outdoor. Further, a snow melting or heating structure persistently achieving the far infrared ray effect which has not been achieved before, is constituted.

When the heating device (10) is utilized as a snow melting and freeze preventing device, there can be achieved following effects (i)–(iv): (i); Even with the heat storing type heat generating body (1), swift elevation of road surface temperature can be achieved, so as to smoothly deal with snow melting and prevention of freeze. (ii); By system formation of the heat storing type heat generating body (1) and the far infrared emissive function, the electricity receiving capacity and the power basic charge are reduced by 50%, and power consumption can be reduced by ⅔. (iii); A snow melting area per unit can be enlarged by 1.5 times or more (25% or more can be saved), to thereby reduce the disposing or laying density of the heat generating bodies (16), so that conservation of material and power can be achieved. (iv); The heat generating element (4) is protected by the heat storing vessel (2) and therefore, the durability and safety are more excellent than those in the conventional system.

The heating device (10) can also be utilized in floor heating at indoor.

According to a conventional indoor heat storing type heat generating device currently used (heat storing type floor heating facility of embedded-in-concrete type), a long heat storing time period of about 6 hours is needed in a time period of absorbing latent heat of a heat storing agent and a time period of elevating floor temperature. For example, in the case of a PTC planar heater (width; 230 mm, thickness; 2 mm, power consumption; 70 W/m) is placed in a contact state on a heat insulating member in which heat pipes (outer diameter; 27 mm, inner diameter; 24 mm) are enclosed with a mirabilite-base heat storing agent (melting point; 31° C., latent heat amount; 42 kcal/kg) are laid on a slab and 50 mm of mortar is applied thereon. Under a condition of room temperature of 17° C., about 6 hours is considered to be needed for the heat storing agent to absorb the melting latent heat (42 kcal/kg) and to raise the floor temperature. In this case, the temperature rise of the floor surface is 18.5° C. at start, 20° C. after elapse of 60 minutes and 26.5° C. at the point of elapse of 6 hours.

By contrast, in an experiment in which a constitution comprising the heat diffusing and heat insulating board constituted by the heat insulating member (12) and the heat diffusing plate (14), the heat storing type heat generating body (1), the protective sheet (18), the surface layer (20) constituted by mortar admixed by far infrared ray radiation agent (thickness; 50 mm), is laid and applied on a concrete slab, the heat storing agent (3) reaches 44° C. in 30 minutes and the floor surface temperature is 18° C. at start and is elevated to 23° C. after elapse of 30 minutes and 28° C. after elapse of 60 minutes. Further, room temperature at start is +6° C.

As mentioned above, a heat storing type floor heating device embedded in concrete in which a heat storing agent absorbs swiftly latent heat and the floor surface temperature can rapidly be elevated is not present currently in the market.

That is, when the heating device (10) according to the embodiment is utilized for a heat storing type floor heating facility, there can be achieved significant effects as follows: (i); The floor surface temperature can swiftly be elevated at least by 2 to 3 times or more of that in the conventional system. (ii); A heat storing agent having a high solidifying temperature can be used. (iii); The heat storing capacity can considerably be increased. (iv); Wasteful electricity conduction at night time can be prevented. (v); Electricity conduction at day time owing to a deficiency in the heat storing capacity is less needed (or totally dispensed with). (vi); Radiation heating by far infrared ray radiation effect is further expedited and made agreeable and so on. Other than these, economic merit of reduction in an electricity receiving capacity and power consumption and so on is added.

As mentioned above, according to the heating device (10) of the embodiment, as the snow melting or heating facilities, a significant effect which has not been achieved can be achieved. The reason is that the heating device (10) constitutes a new mechanism, in radiation transfer of energy utilizing far infrared ray. That is, to effectively use far infrared ray, following is important. The far infrared ray having maximum absorption region at wavelength region in which to-be-heated or heated object absorbs most efficiently is stably radiated into a wide area. Further, The far infrared ray is made to reach the to-be-heated or heated object at a minimum attenuation rate and is absorbed thereby efficiently.

Therefore, the heating device (10) is constituted as follows: The phase transition type storing agent (3) absorbing electromagnetic wave for a molecular structure of an electric dipole, is selected; The heat storing type heat generating body (1) combined with the heat radiating plate (5) and the heat radiating metal line (6) having the far infrared emissive layers enabling two kinds of heat transfer of far infrared ray radiation transfer and contact heat conduction, are used in the heat storing agent (3) as the heat generating body (16); In order to make efficient and effective use of energy radiated and conducted from the heat storing type heat generating body (1), in a snow melting or heating in facilities, the heat diffusing and heat insulating board comprising the heat insulating member (12) and the heat diffusing plate (14), the protective sheet (18) and the surface layer (20) are integrated with layers admixed by the far infrared emissive material to thereby constitute the system.

The heat diffusing and heat insulating board transfers heat into a road by receiving heat energy which varies by a small amount and which is supplied by conduction from the heat storing type heat generating body (1). At the same time, the heat diffusing and heat insulating board converts the heat energy into far infrared ray and radiates and propagates it widely to the surface layer (20), at a stabilized wavelength region. In such a case, when temperature of the heat source is varied, the maximum wavelength region of far infrared ray is also varied and further effective far infrared ray radiation is hampered, however, such a phenomenon is not caused since the heat source is constituted by the heat storing type heat generating body (1).

In order to prevent lowering of strength of the surface layer caused by embedding of the heat diffusing and heat insulating board or the heat generating body, the protective sheet (18) is laid to integrate the surface layer, the heat source portion and the base layer. Further, due to inclusion of the far infrared emissive material, in addition to admixing of the far infrared emissive material to the surface layer (20), far infrared ray radiated from the heat storing vessel (2) and the surface of the heat diffusing and heat insulating board reaches the surface of the surface layer at a minimum attenuation and is absorbed by a to-be-heated or heated object.

As mentioned above, according to the heating device (10), a significant effect which has not been achieved can be achieved, by the heat storing type heat generating body (1) maximally utilizing radiation transfer of far infrared ray and system formation of heat conduction and radiation transfer (radiation of far infrared ray at low temperature region) to the surface of the surface layer.

EXAMPLE 2

As a base stuff, nonwoven cloth (200 g/m$^2$, thickness; 1.8 through 2.0 mm) by the needle punch process (120 times/cm$^2$) using polypropylene long fiber of 8 denier is used. Used mixture liquid is obtained as follows. Twenty weight parts of fine powder of far infrared emissive material and 30 weight parts of fine powder of graphite is added to 100 weight parts of semi-blown asphalt, and which are heated and mixed together. The far infrared emissive material is constituted by pertinently blending silica $SiO_2$, alumina $Al_2O_3$, iron oxide $Fe_2O_3$ and manganese dioxide $MnO_2$. The fine powder of graphite have conductivity of 120 kcal/mh° C. The semi-blown asphalt have the softening point of 90° C. and the penetration of 40 (25° C.).

The base stuff is impregnated with the mixture liquid to provide a protective sheet (impregnation rate=750%) having a thickness of 2 mm.

COMPARATIVE EXAMPLE 3

A sheet is prepared similar to Embodiment 2 except that far infrared emissive material and graphite are not added to the mixture liquid.

TEXT EXAMPLE 5

A test of comparing thermal conduction characteristics of Embodiment 2 and Comparative Example 3 is carried out. Dimensions of both sheets are set to 230 mm width×200 mm length.

As shown by FIGS. 15(a) and 15(b), the mortar base layer (thickness; 50 mm) (22) is formed in a heat insulating frame body (70), a PTC planar electric heater (size; 230×700×t3 mm, voltage; 200 V, power consumption amount; 70 W/m (20° C.)) (72) is mounted thereon, a sheet a of Embodiment 2 and a sheet β of Comparative Example 3 are mounted on the heater (72) and are embedded by the mortar surface layer (thickness; 30 mm) (20).

The test body is brought under an 0° C. atmosphere, the surface of the surface layer (20) is brought into a wetted state and temperature of the surface of the surface layer (20) on the upper side of each of the sheets is measured. Further, temperature measuring points (III) are disposed at positions in correspondence with substantial centers of the respective sheets α and β on the surface of the surface layer (20). The temperature at start of test is 7.7° C. in Embodiment 2 and 6.7° C. in Comparative Example 3. Further, controlling of heat generating temperature of the heater (72) is not carried out, so that temperature controlling is left to work by self temperature control function.

After elapse of 60 minutes from start of electricity conduction, the surface temperature of the surface layer (20) above the sheet a of Embodiment 2 becomes 26.0° C. At this time, temperature of the surface of the surface layer (20) above the sheet β of Comparative Example 3 becomes 15.2° C. That is, according to Embodiment 2, the temperature is elevated by 18.3° C. after elapse of 60 minutes from start of electricity conduction. In the meantime, according to Comparative Example 3 which is fabricated using water shielding sheet on sale, the temperature is elevated only by 8.5° C.

It becomes apparent from the result that the protective sheet according to the present invention is provided with a characteristic totally different from that of the conventional water shielding sheet and there is achieved a differentiating superiority in respect of the thermal conduction performance and the far infrared ray radiation effect. Such a protective sheet having thermal fusion performance and having the far infrared ray radiation characteristic and the thermal conduction effect is not present in the current market.

TEST EXAMPLE 6

In order to show an effect when the protective sheet of Embodiment 2 is applied to a snow melting device for a road, a road-pavement test body D for experimental use integrated with a snow melting device is fabricated in reference to an asphalt pavement prescription (cold district specification 13F).

Figure 16:
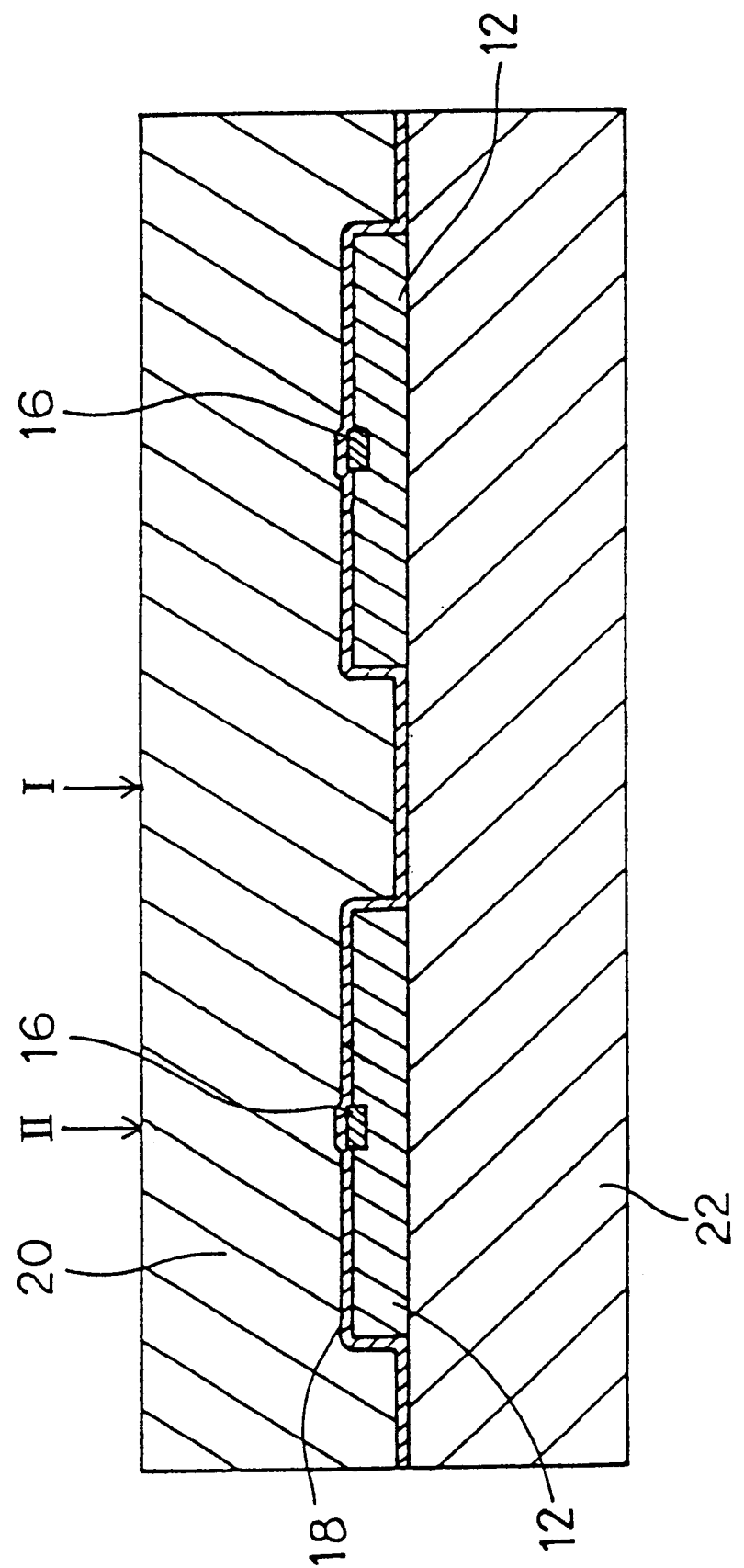
FIG. 16 is a sectional view of a test body D according to Test Example 6.

The test body D is provided with a structure shown by FIG. 16. The base layer (22) is formed by rough particle size asphalt concrete and the thickness is set 65 mm. As the heat diffusing and heat insulating board, the highly pressure-resistant (16 kg/cm$^2$) insulating plate (12) (thickness; 10 mm) mounted with an aluminum plate (thickness; 0.5 mm) having a far infrared emissive layer thereon is used. The heat diffusion and heat insulating board is constituted by width 100 mm×length 800 mm×thickness 10 mm and two sheets of them are fixedly laid at center-to-center interval of 150 mm. As the heat generating body (16), a PTC tape heater (voltage; 200 V, power consumption 65 W/m (in snow melting), width 12 mm×length 610 mm×thickness 6 mm) is used. As the surface layer (20), densely fine particle size asphalt concrete 13F (admixed by 7% of far infrared emissive material) is formed by a thickness of 75 mm. Further, heat insulating process is applied around the test body D.

The test body D is brought under an atmosphere at −20° C. and a change in the surface temperature of the surface layer (20) is measured. The surface temperature is constituted by an average value of a temperature of an upper portion at an intermediary position (measuring point I) of two of the heat generating bodies (16) and a temperature right above (measuring point II) the heat generating body (16). The change in temperature is shown by FIG. 17.

Further, for comparison, in respect of a test body E in which the heat diffusing and heat insulating board and the protective sheet (18) are not installed and the far infrared emissive material is not added to the surface layer and only two of the heat generating bodies (16) are embedded, a change in the surface temperature of the surface layer (20) is measured under a similar condition.

Figure 17:
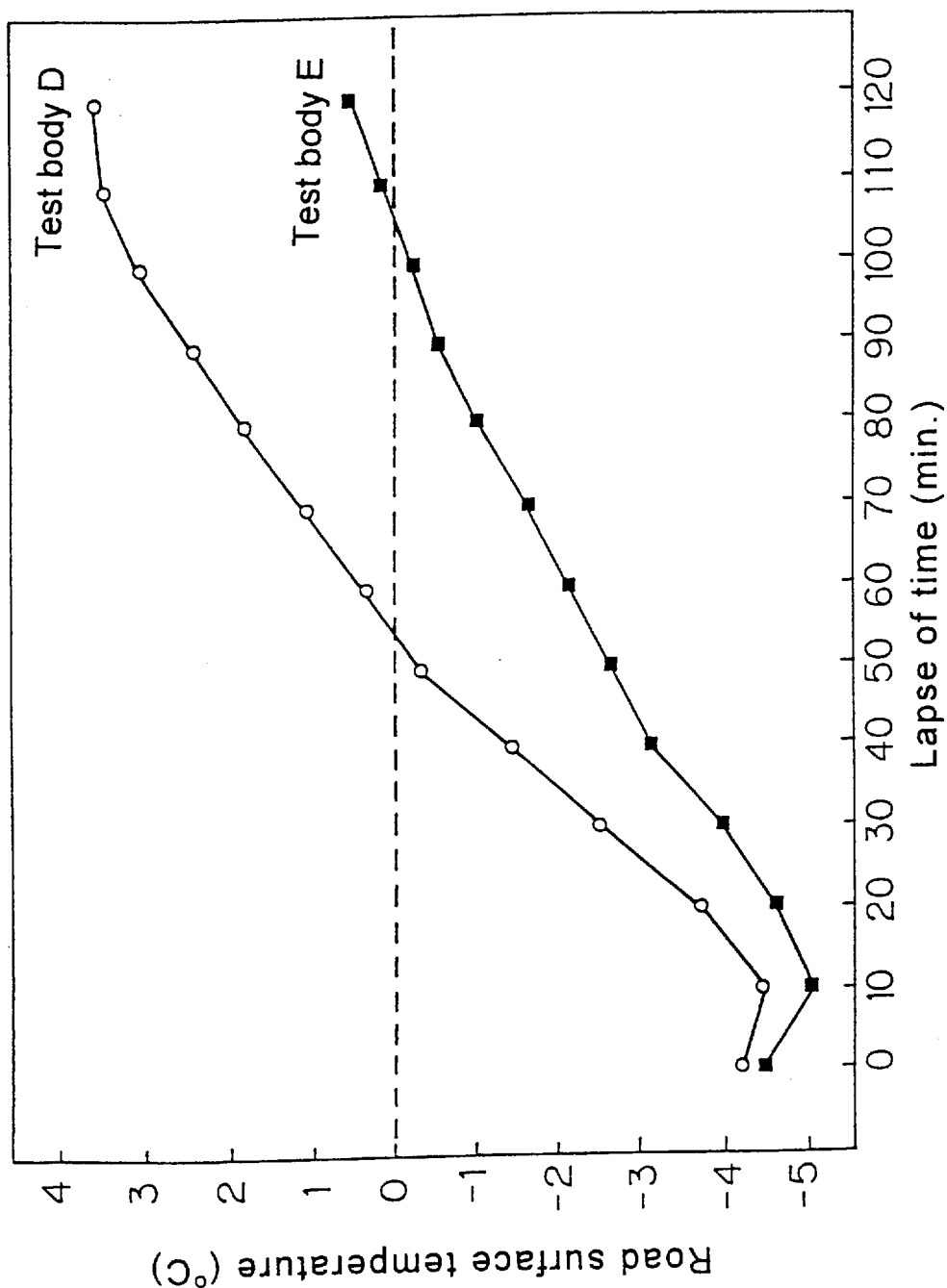
FIG. 17 shows graphs indicating temperature change of the test body D according to Test Example 6.

As shown by FIG. 17, according to the test body D using the protective sheet of Embodiment 2, the surface temperature of −4.3° C. at start of electricity conduction is changed to +0.36° C. exceeding 0° C. after elapse of 60 minutes. Further, after elapse of 120 minutes, the surface temperature is elevated to +3.5° C. By contrast, in the test body E, about 110 minutes is required for the surface temperature, that is −4.4° C. at start of electricity conduction, to exceed 0° C. The surface temperature is elevated only to +0.5° C. after elapse of 120 minutes.

TEXT EXAMPLE 7

By using the protective sheet of Embodiment 2, a test body for floor heating in facilities is prepared and a test of elevating floor surface temperature at indoor is carried out.

The test body is provided with a structure shown by FIG. 7 in which the heat diffusing and heat insulating board (12) having a thickness of 10 mm is disposed on the mortar base layer (22) having a thickness of 80 mm, the heat storing type heat generating body (16) is inserted into the groove (13), a total thereof is covered by the protective sheet (18) and the mortar surface layer (20) having a thickness of 50 mm admixed by a far infrared emissive material is formed thereon. Further, the heat storing type heat generating body (16) the same as that in Embodiment 1 is used.

When electricity conduction is started at floor surface temperature of 18° C. and room temperature of 17° C. and the floor surface temperature is measured, the temperature is 26° C. after elapse of 30 minutes from start of electricity conduction and 32° C. after elapse of 60 minutes and it is known that the test body can sufficiently be applied to floor heating.

INDUSTRIAL APPLICABILITY

According to the heating device of the present invention, an effect of heating a to-be-heated or heated object uniformly over its entire region can be achieved and the heat generating body having the PTC characteristic can effectively be utilized.

In the case of the heat storing type heat generating body of the present invention, effective use of energy generated from the heat generating element and high efficiency formation of absorbing energy of the heat storing agent can be achieved. Further, latent heat can swiftly be absorbed, the heat storing agent having high melting point can be used and the high heat storing capacity can be achieved.

In the case of the protective sheet of the present invention, protection of the heat source portion embedded under the surface layer and promotion of strength and durability of the surface layer can be achieved by which protection and strengthening of a total of the heating device can be achieved. Further, effective use of far infrared ray radiation energy can be achieved.

What is claimed is:

1. A heating device comprising a heat insulating member having a recess portion on an upper face thereof, a heat generating body arranged in the recess portion and a heat diffusing plate installed on the upper face of the heat insulating member and interposed between the heat insulating member and the heat generating body for diffusing heat generated from the heat generating body:

wherein the recess portion is formed in a groove shape extended substantially at a center of the upper face of the insulating member in a plate-like shape, and the heat diffusing plate is integrally installed with the upper face of the insulating member including the recess portion along the upper face.

2. The heating device according to claim 1, wherein a far infrared emissive layer is formed on an upper face of the heat diffusing plate.

3. The heating device according to claim 1, wherein the heating body is provided with a self temperature control function.

4. The heating device according to claim 1, wherein a far infrared emissive layer is arranged to cover the heat insulating member from above the heat generating body.

5. The heating device according to claim 2, wherein a surface layer is formed on the far infrared emissive layer arranged to cover the heat insulating member and the base layer, the surface layer, the heat insulating member and the heat generating body are fuse d to integrate by the thermal fusion performance of the far infrared emissive layer.

6. The heating device according to claim 2, wherein the far infrared emissive layer arranged to cover the heat insulating member is formed by a protective sheet having both far infrared ray radiation function and the thermal fusion performance, which protective sheet is obtained by impregnating a base stuff with a mixture liquid constituted by adding a far infrared emissive material to petroleum asphalt, and heating and mixing the far infrared emissive material and the petroleum asphalt.

7. The heating device according to claim 2, wherein a surface layer is formed on the far infrared emissive layer arranged to cover the heat insulating member and the surface layer is admixed by a far infrared emissive material having an absorption band at wavelength region of a far infrared ray radiated from the far infrared emissive layer.

8. A heating storing type heat generating body, wherein in a vessel enclosed with a heat storing agent for absorbing latent heat by a phase transition between a solid phase and a liquid phase, a heat generating element is inserted in a state in which the heat generating element is brought into contact with the heat storing agent;

wherein the heat generating element is mounted with heat radiating plates for diffusing heat into the vessel;

wherein the heat storing agent is a heat storing agent having an electric dipole molecular structure absorbing a far infrared ray; and wherein a far infrared emissive layer is formed on surfaces of the heat radiating plates.

9. The heat storing type heat generating body according to claim 8, wherein the heat generating element is an electric heater having a self temperature control function.

10. The heat storing type heat generating body according to claim 8, wherein the heat storing agent is admixed by a far infrared emissive material having an absorption at wavelength region of a far infrared ray radiated from the far infrared emissive layer formed on the surfaces of the heat radiating plates.

11. The heat storing type heat generating body according to claim 8, wherein two kinds or more of t he heat storing agents having different melting temperatures are enclosed in the vessel.

12. The heat storing type heat generating body according to claim 8, wherein a ceramic coating layer including a far infrared emissive material is formed on a surface of the vessel.

13. A protective sheet for a heating device having both of a far infrared ray radiation function and a thermal fusion performance which is constituted by impregnating a mixture liquid constituted by adding a far infrared emissive material to petroleum asphalt, heating and mixing the petroleum asphalt and the far infrared emissive material.

14. The protective sheet according to claim 13, wherein graphite is admixed to the mixture liquid.

15. A protective sheet for a heating device having a double layer structure constituted by coating a mixture of petroleum asphalt and a far infrared emissive material on one face or both faces of the protective sheet according to claim 13 or 14.

16. A heating device comprising a heat insulating member having a recess portion on an upper face thereof, a heat generating body arranged in the recess portion and a heat diffusing plate installed on the upper face of the heat insulating member and interposed between the heat insulating member and the heat generating body for diffusing heat generated from the heat generating body:

wherein the heat generating body is a heat storing type heat generating body, the heat storing type heat generating body is constituted such that in a vessel enclosed with a heat storing agent for absorbing latent heat by a phase transition between a solid phase and a liquid phase, a heat generating element is inserted in a state in which the heat generating element is brought into contact with the heat storing agent, while the heat generating element is mounted with heat radiating plates for diffusing heat into the vessel; and wherein the heat storing agent is a heat storing agent having an electric dipole molecular structure for absorbing a far infrared ray, while a far infrared emissive layer is formed on surfaces of the heat radiating plates.

17. A heating device comprising a heat insulating member having a recess portion on an upper face thereof, a heat generating body arranged in the recess portion and a heat diffusing plate installed on the upper face of the heat insulating member and interposed between the heat insulating member and the heat generating body for diffusing heat generated from the heat generating body:

wherein the heat insulating member is arranged on a base layer, while a far infrared ray having thermal fusion performance is arranged to cover the insulating member from above the heat generating body and the heat insulating member, so that the heat generating body are integrated to fix on the base layer by the thermal fusion performance.

18. A heat storing type heat generating body, wherein a vessel enclosed with a heat storing agent for absorbing latent heat by being subjected to a phase transition between a solid phase and a liquid phase, a heat generating element is inserted in a state in which the heat generating element is brought into contact with the heat storing agent;

wherein the heat generating element is mounted with heat radiating plates for diffusing heat into the vessel; and wherein a metal heat radiating line coated with a far infrared emissive layer is wound around outer peripheries of heat radiating plates mounted to the heat generating element.

* * * * *